United States Patent [19]
Koshiyouji

[11] Patent Number: 5,963,538
[45] Date of Patent: Oct. 5, 1999

[54] DISK CARTRIDGE

[75] Inventor: Takashi Koshiyouji, Yokohama, Japan

[73] Assignee: Kabushiki Kaisha Toshiba, Kawasaki, Japan

[21] Appl. No.: 08/943,938

[22] Filed: Sep. 30, 1997

[30] Foreign Application Priority Data

| Sep. 30, 1996 | [JP] | Japan | 8-259934 |
| Sep. 30, 1996 | [JP] | Japan | 8-259935 |
| Sep. 30, 1996 | [JP] | Japan | 8-278883 |
| Sep. 30, 1996 | [JP] | Japan | 8-299910 |

[51] Int. Cl.$^6$ .............................. G11B 7/26; G11B 23/03
[52] U.S. Cl. .......................................... 369/291; 360/133
[58] Field of Search ......................... 360/60, 133, 137; 369/275.5, 289, 290, 291, 292

[56] References Cited

U.S. PATENT DOCUMENTS

| 4,589,105 | 5/1986 | Nemoto et al. | 369/291 |
| 4,851,948 | 7/1989 | Kato et al. | 360/133 |
| 4,853,925 | 8/1989 | Kaneuchi | 369/291 |
| 4,908,726 | 3/1990 | Kato | 360/133 |
| 4,918,559 | 4/1990 | Maruyama et al. | 360/133 |
| 5,040,167 | 8/1991 | Tanaka et al. | 369/291 |
| 5,050,030 | 9/1991 | Nemoto et al. | 360/133 |
| 5,272,693 | 12/1993 | Fujisawa | 369/291 |
| 5,280,467 | 1/1994 | Wanger et al. | 369/275.5 |
| 5,717,684 | 2/1998 | Akiyama et al. | 369/291 |
| 5,764,622 | 6/1998 | Kawamura et al. | 369/291 |

FOREIGN PATENT DOCUMENTS

| 137 965 | 4/1985 | European Pat. Off. . |
| 264 237 | 4/1988 | European Pat. Off. . |
| 368 347 | 5/1990 | European Pat. Off. . |
| 768 665 | 4/1997 | European Pat. Off. . |
| 795 866 | 9/1997 | European Pat. Off. . |
| WO97/11463 | 3/1997 | WIPO . |

*Primary Examiner*—David L. Ometz
*Assistant Examiner*—Angel Castro
*Attorney, Agent, or Firm*—Pillsbury Madison & Sutro

[57] ABSTRACT

Arranged in each of spring storing sections on either side of a window section are a retaining spring bearing situated adjacent to the window section and a fixed spring bearing situated at a distance from the window section. A shutter has a pair of movable spring bearings that are situated individually in alignment with the retaining spring bearings when the shutter is in its closed position. A fixed end of each of shutter springs is held by means of the fixed spring bearing. A movable end of each shutter spring engages its corresponding retaining spring bearing and the movable spring bearing in alignment therewith when the shutter is in the closed position, is pressed toward the fixed end and separates from the retaining spring bearing when the shutter moves from the closed position toward one of open positions, and separates from the movable spring bearing and is held by the retaining spring bearing when the shutter moves from the closed position toward the other open position.

22 Claims, 18 Drawing Sheets

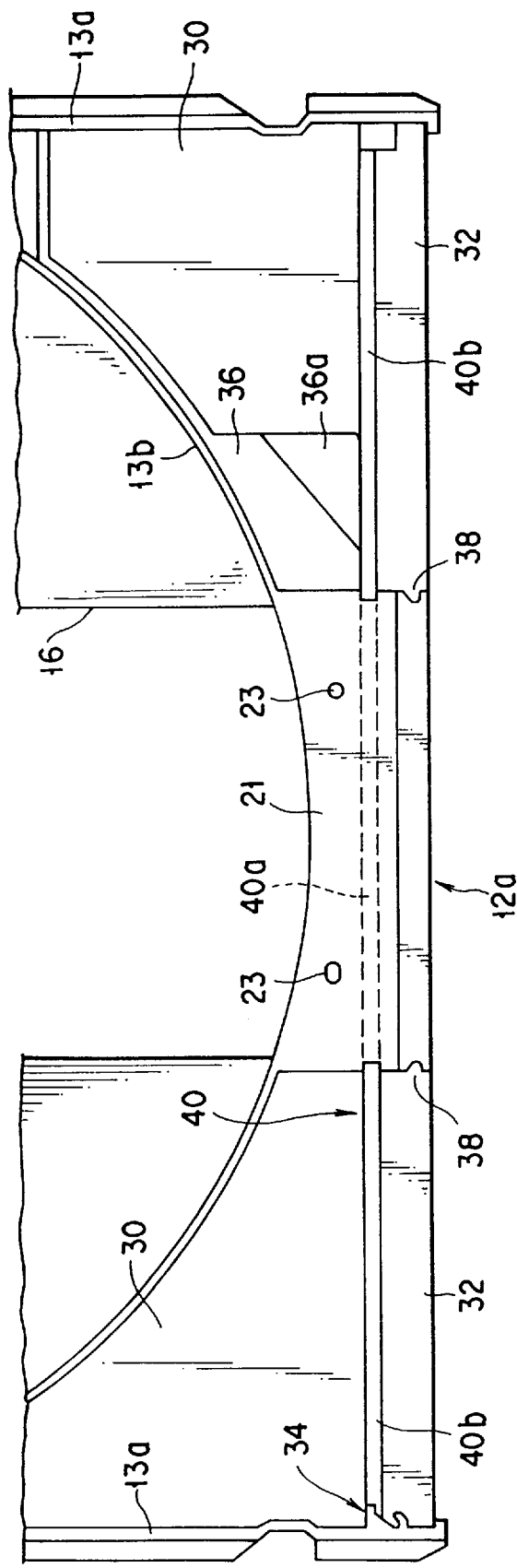
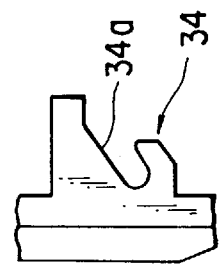
FIG. 4A
FIG. 4B

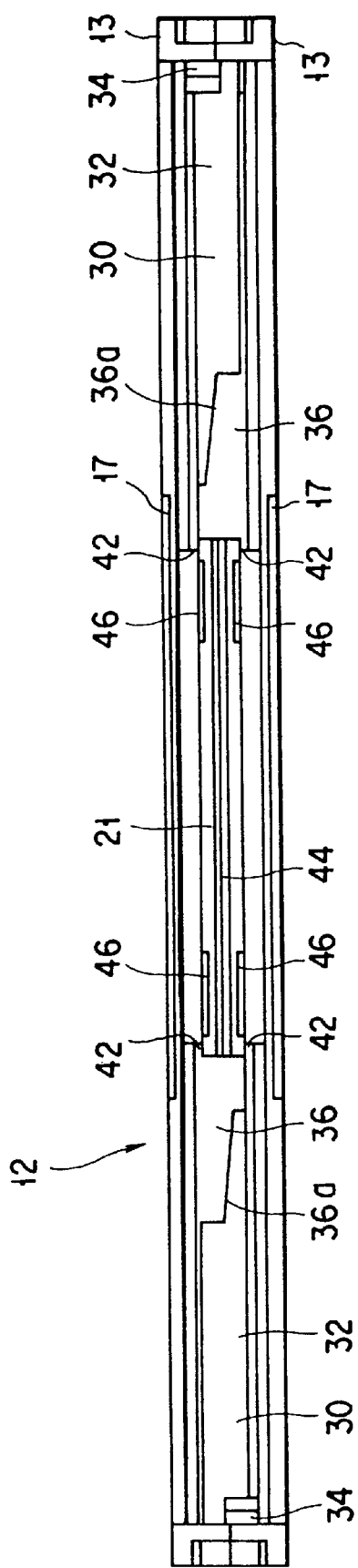
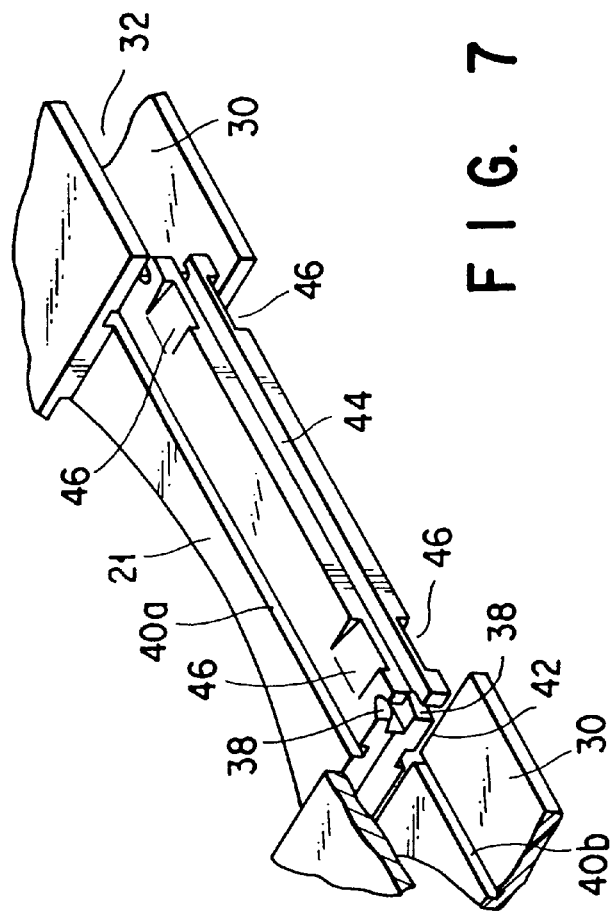
FIG. 6
FIG. 7

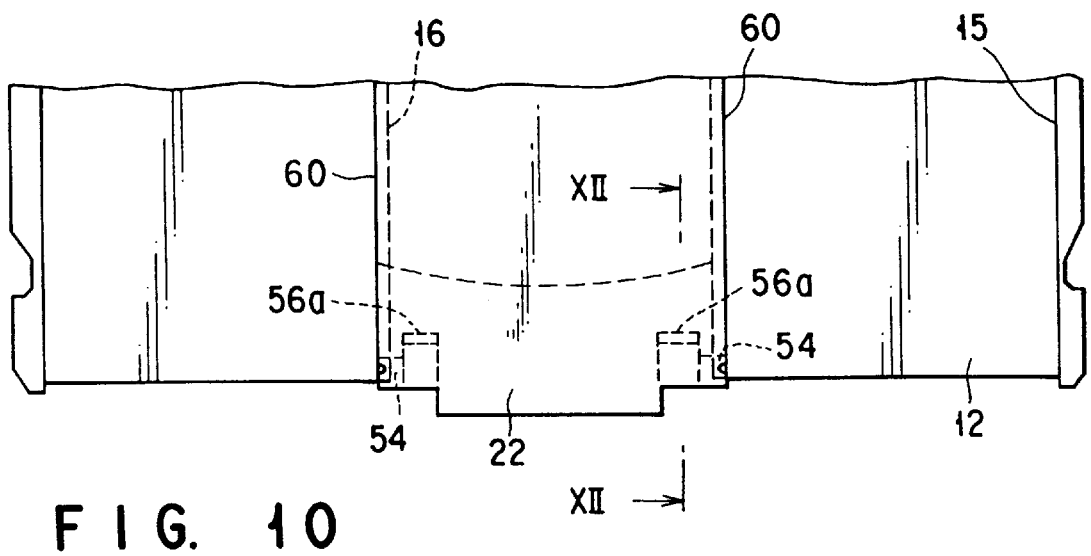
F I G. 10
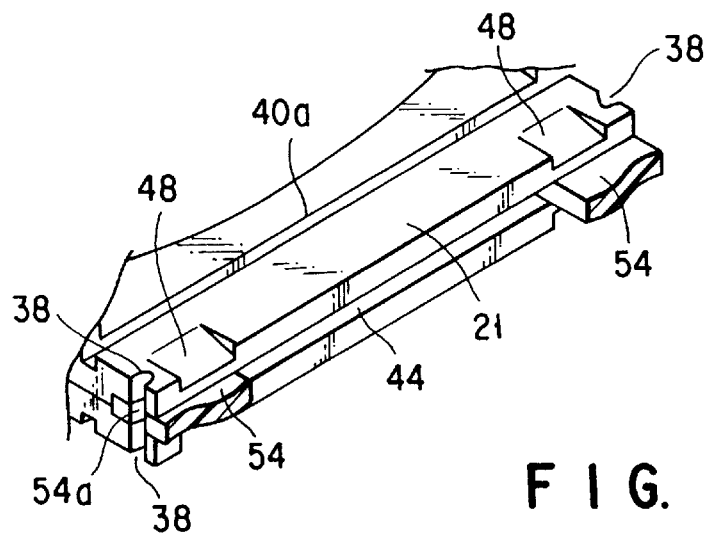
F I G. 11
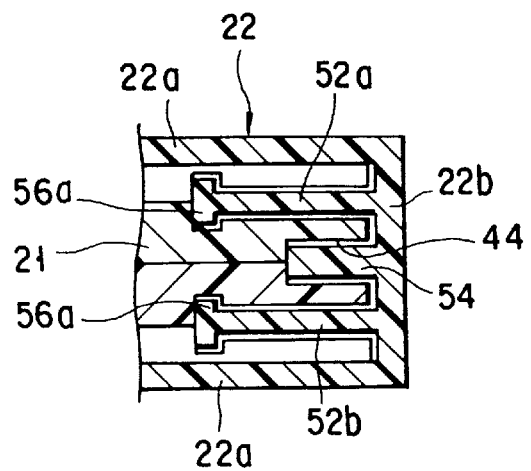
F I G. 12

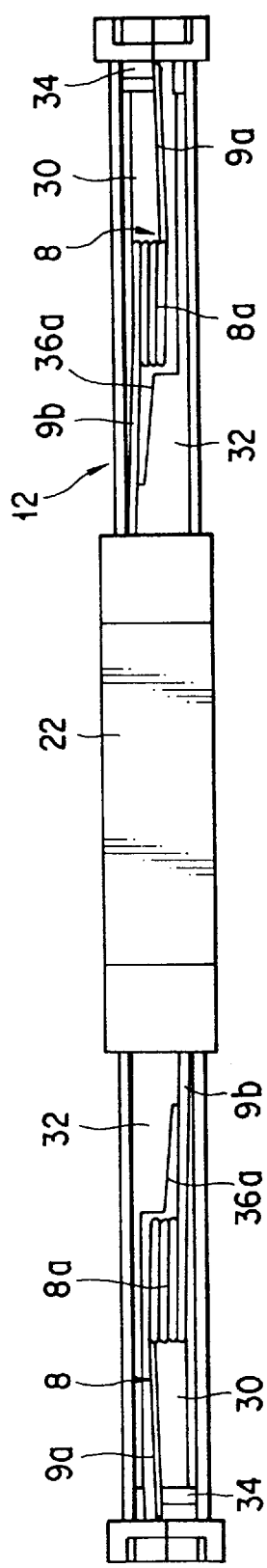
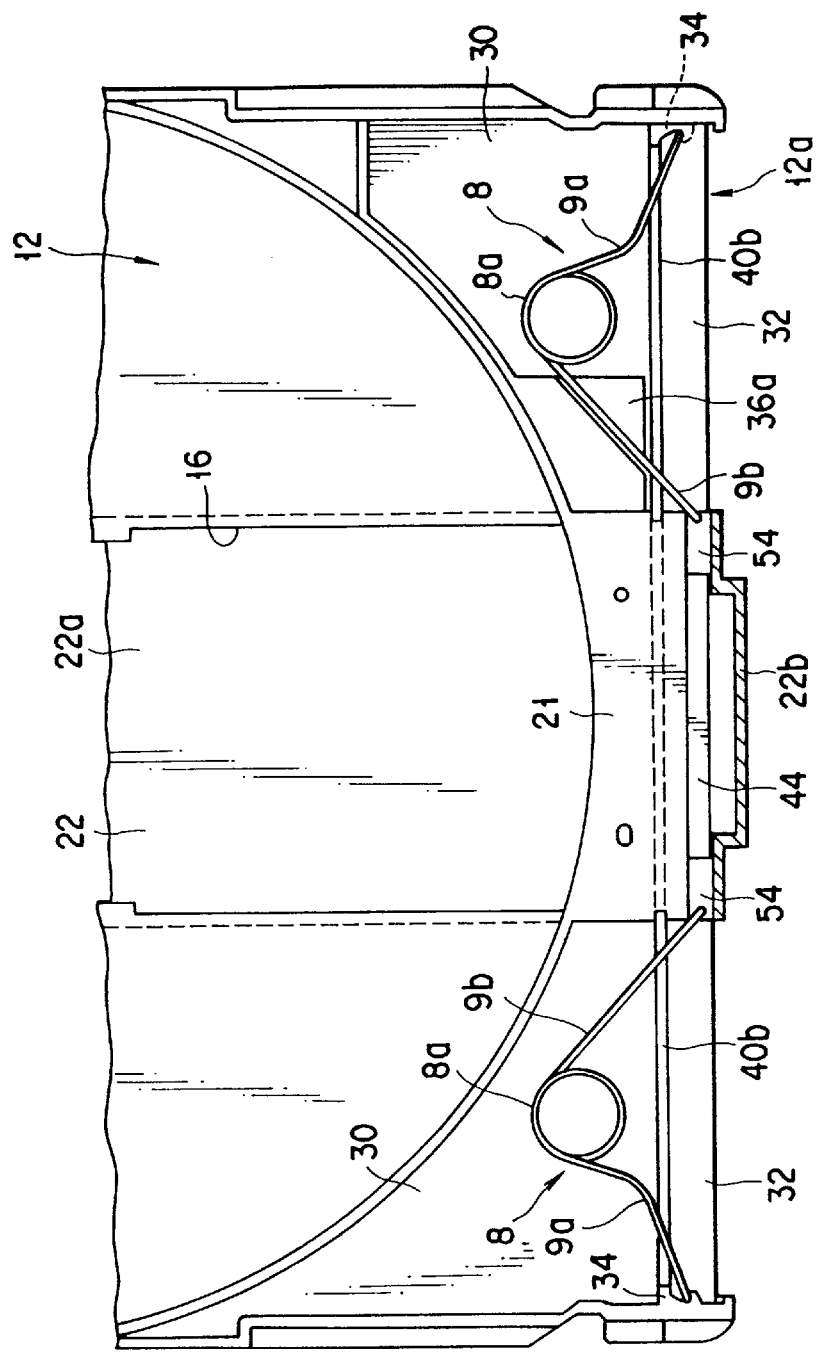
FIG. 16
FIG. 17

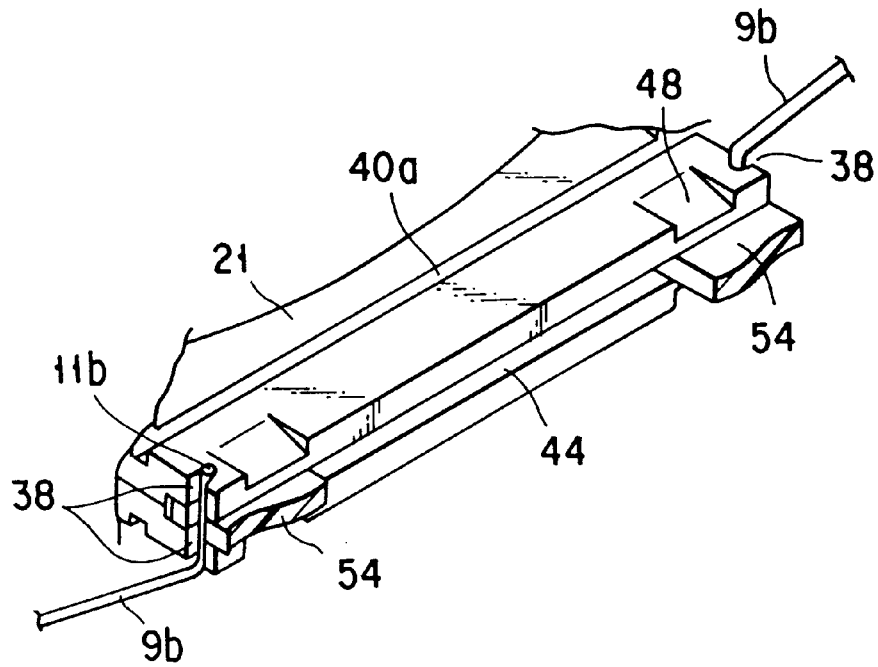
F I G. 18
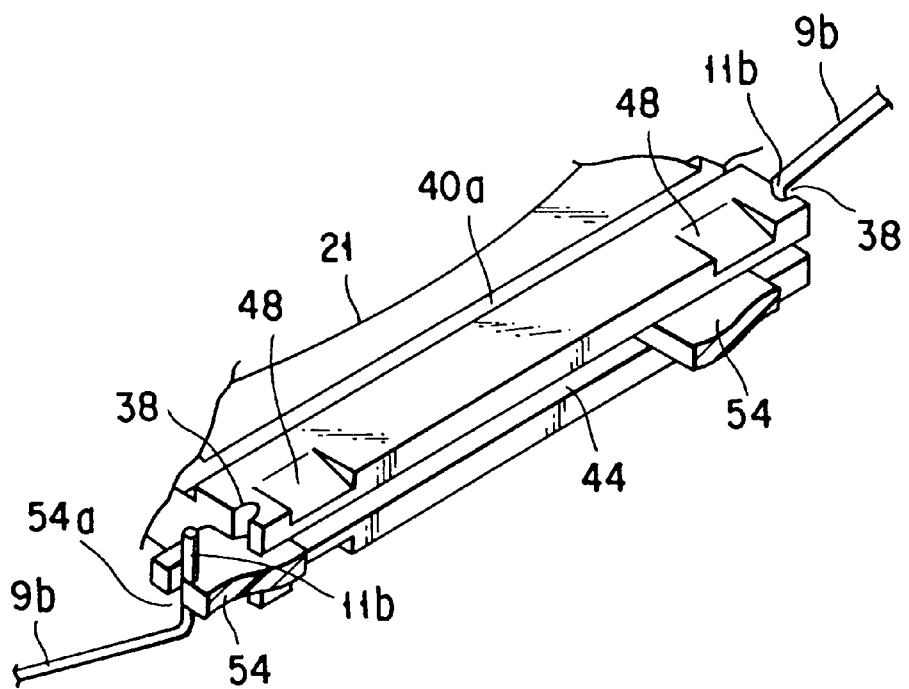
F I G. 19

DISK CARTRIDGE

BACKGROUND OF THE INVENTION

The present invention relates to a disk cartridge containing an optical disk for use as a recording medium, and more particularly, to a disk cartridge provided with a shutter capable of sliding in two opposite directions.

These days, 90 mm optical disks of a magnetooptic (MO) recording type are widely used as large-capacity recording media that replace floppy disks. Recently, moreover, there have been developed 90 mm reloadable optical disks of a phase-change (PC) type that are double-sided and can enjoy a larger capacity, and optical disk drives that are furnished with these optical disks.

The basic dimensions of a PC-type optical disk, including the longitudinal and transverse dimensions, are identical with those of a 90 mm MO-type disk. In order to make the most of the features of the disk of this type, however, the disk is provided with an exclusive-use cartridge that is characterized by its thickness and a unique shutter sliding mechanism.

In general, a disk cartridge comprises a flat rectangular casing that contains an optical disk therein. The casing has a window section on each side thereof, through which a part of the optical disk and a hub are exposed. The casing is provided with a slidable shutter for opening and closing the window sections.

Recently proposed disk cartridges of this type are described in Jpn. Pat. Appln. KOKAI Publication Nos. 63-119081 and 63-94487, for example. These cartridges are of a two-way shutter type, and are provided with a shutter that can slide on either side of the window sections.

One such disk cartridge of the two-way shutter type comprises a pair of shutter springs that are arranged on either side of the shutter, and the shutter is held by means of the shutter springs in a closed position where it closes the window sections. Each shutter spring has one end fixed to the casing and the other end fixed to the shutter. Further, the shutter is formed having two apertures that are spaced as desired. As the shutter is slid in one direction, resisting the urging force of one shutter spring, one of the apertures of the shutter is opposed to its corresponding window section, thereby allowing the window section to open.

Further, there is provided a two-way-shutter disk cartridge of another type, which comprises a guide shaft extending across the width of a casing, a pair of sliders slidably mounted on the guide shaft, a tension spring connecting the sliders to each other, and a protrusion formed on the inner surface of the casing so as to restrain the sliding motion of each slider.

In sliding the shutter of this disk cartridge in one direction, one of the sliders move together with the shutter on the guide shaft, while the other slider is restrained from moving in the one direction by the protrusion. Thereupon, the shutter moves to its open position under the urging force of the tension spring. When the shutter is released from a force to slide it in the direction to open the window sections of the casing, it is returned by means of the urging force of the tension spring to its closed position where it closes the window sections.

According to the foregoing disk cartridge having the pair of shutter springs, however, it is difficult to hold the shutter accurately in the closed position, due to variation in the urging force of the shutter springs and the like. Since each shutter spring extends or contracts as the shutter is slid to open the window sections, moreover, the shutter cannot enjoy a generous movement stroke.

On the other hand, the disk cartridge that is provided with the guide shaft, sliders, etc. includes so many components that its manufacturing cost is high, and its structure is too complicated to be assembled with ease. Thus, the disk cartridge of this type is not suited for automatic assembly in mass production, in particular.

Meanwhile, it has been ten years or more since music compact disks were first developed, and read-only optical disks (hereinafter referred to as ROM-type disks) of various kinds, represented by CD-ROMs, photo-CDs, etc. for personal computers, have been developed and widely used for business or public use. Besides these ROM-type disks, there have recently been developed ROM-type disks (CD-R) that permit writing of data only once and recording/reproducing disks (hereinafter referred to as RAM-type disks) that permit repeated recording and erasure. As a result, optical disks of ten kinds or more are commercially available.

For economic reasons or due to restrictions on the manipulation of drive units, necessity to secure installation spaces, etc., it is practically impossible to provide various drive units for various optical disks. If currently developed RAM-type optical disks come into wide use, disk data recorded by one user may possibly be utilized by another user who owns only a ROM-type drive unit.

Accordingly, there is a demand for drive units that can retrieve data from optical disks of different kinds or standards. It is to be understood that there are similar demands for drive units that can record and erase data in like manner.

Naturally, drive units owned by users who frequently use RAM-type disks for data storage are recording-type drive units that can also retrieve data from ROM-type disks. However, those drive units which are owned by many of users who usually reproduce commercially available software, electronic books, etc., for example, are very likely to be read-only drive units that cannot retrieve data from any other disks than ROM-type disks. Accordingly, a RAM-type disk is expected to be able to fetch data also from drive units for ROM-type disks.

While many of ROM-type optical disks have a plain form such that they can be singly loaded into a drive unit, RAM-type disks are contained in an exclusive cartridge each. In order to retrieve data from a RAM-type disk by means of a drive unit for ROM-type disks, therefore, the RAM-type disk must be taken out of its cartridge. Among currently available RAM-type disks, no one is provided with a cartridge from which it can be taken out. Since a lot of drive units have already been put on the market, it is practically difficult, at present, to change standards for any of disks and standardize the hardware conditions.

Although a RAM-type disk contained in a cartridge can be taken out of the cartridge and loaded into a drive unit for ROM-type disks, data recorded in the fetched disk cannot be accessed unless they are retrieved by means of the drive unit. If a plurality of disks are taken out, moreover, original cartridges in which the disks have been contained individually cannot be discriminated from one another.

BRIEF SUMMARY OF THE INVENTION

The present invention has been contrived in consideration of these circumstances, and an object of the invention is to provide a disk cartridge of simple construction, which can be assembled automatically and in which a shutter can be securely held in its closed position.

Another object of the invention is to provide a disk cartridge, in which data can be retrieved from a disk medium by means of different disk drive units.

In order to achieve the above object, a disk cartridge according to the present invention comprises a casing containing a disk-shaped recording medium and having a window section through which a part of the recording medium is exposed, a shutter attached to the casing for movement between a closed position in which the shutter closes the window section and two open positions on either side of the window section in which the shutter allows the window section to open, and a pair of shutter springs arranged on either side of the shutter in the casing and urging the shutter toward the closed position, thereby holding the shutter in the closed position.

Each of the shutter springs has a fixed end fixed to the casing and a movable end adapted releasably to engage the casing and the shutter when the shutter is in the closed position. When the shutter moves from the closed position toward one of the open positions, the shutter presses the movable end of the shutter spring on the side of the one open position toward the fixed end, thereby disengaging the movable end from the casing, and separates from the movable end of the shutter spring on the side of the other open position.

In another disk cartridge according to the invention, each of the shutter springs arranged on either side of the window section in the casing has a fixed end fixed to the casing and a movable end adapted releasably to engage the casing and the shutter when the shutter is in a closed position. When the shutter moves from the closed position toward one of the open positions, the movable end of the shutter spring on the side of the one open position is pressed toward the fixed end to be disengaged from the casing by the shutter, with the movable end of the shutter spring on the side of the other open position disengaged from the shutter and kept in engagement with the casing.

Still another disk cartridge according to the embodiment comprises a casing containing a disk-shaped recording medium and having a window section through which a part of the recording medium is exposed, a shutter attached to the casing for movement between a closed position in which the shutter closes the window section and two open positions on either side of the window section in which the shutter allows the window section to open, and a pair of shutter springs arranged on either side of the shutter in the casing and urging the shutter toward the closed position, thereby holding the shutter in the closed position.

The casing includes spring storing sections formed on either side of the window section and individually containing the shutter springs. Retaining spring bearings situated adjacent to the window section in the respective spring holding sections, and fixed spring bearings situated at distances from the window section in the spring holding sections, individually. The shutter includes a pair of movable spring bearings adapted to be situated individually in line with the retaining spring bearings when the shutter is in the closed position.

Each of the shutter springs is formed of a torsion spring, and has a fixed end in engagement with each corresponding fixed spring bearing and a movable end. The movable end of each shutter spring engages each corresponding retaining spring bearing and the movable spring bearing in alignment therewith when the shutter is in the closed position, moves in engagement with the movable spring bearing toward the fixed end and separates from the retaining spring bearing when the shutter moves from the closed position toward the one open position, and separates from the movable spring bearing and is held by the retaining spring bearing when the shutter moves from the closed position toward the other open position.

According to the disk cartridge constructed in this manner, when the shutter is moved to the closed position, it is urged by the shutter springs to be held in the closed position. As this is done, the movable end of each shutter spring engages the casing as well as the shutter, so that the urging force of the spring is restricted. Thus, the shutter can prevented from being urged excessively.

When the shutter is open, the movable end of the open-side shutter spring is forced to separate from the casing by the shutter, and moves in engagement with the shutter toward the fixed end. On the other hand, the movable end of the other shutter spring is held in engagement with the casing, and separates from the shutter. Thereupon, the shutter can move to the open position under the urging force of the one shutter spring only.

Another disk cartridge according to the invention comprises a casing containing a disk-shaped recording medium and having a window section through which a part of the recording medium is exposed, a shutter attached to the casing for movement between a closed position in which the shutter closes the window section and two open positions on either side of the window section in which the shutter allows the window section to open, guide means for guiding the shutter in movement, and a pair of shutter springs arranged on either side of the shutter in the casing and urging the shutter toward the closed position, thereby holding the shutter in the closed position.

The casing includes spring storing sections formed on either side of the window section and individually containing the shutter springs, two aperture portions opening in the front end face of the casing, communicating individually with the spring storing sections, and allowing the shutter springs to be inserted therein, and a bridge section situated between the aperture portions and facing the window section.

The guide means includes a guide groove extending along the front end face of the casing and a guide protrusion provided on the shutter and movable on the bridge section and in each spring holding section as the shutter moves.

The guide groove has a first portion formed on the bridge section and a pair of second portions formed on the inner surface of the casing in each spring storing section and aligned straight with the first portion. The guide protrusion has a first projection adapted to engage the first portion as the guide protrusion moves on the bridge section and a second projection adapted to engage the second portion as the guide protrusion moves in the spring storing section.

According to the disk cartridge constructed in this manner, the pair of shutter springs can be mounted in position by being inserted into the spring storing sections through the aperture portions of the casing, individually, after the shutter is attached to the casing at the time of assembly.

As the shutter is slid to open or close the window section, the guide protrusion on the shutter guides the shutter in movement in a manner such that the first projection engages the first portion of the guide groove as the guide protrusion moves on the bridge section. As the guide protrusion moves in each spring storing section, it guides the shutter in movement in a manner such that the second projection engages the second portion of the guide groove on the inner surface of the casing. Thus, the guide protrusion can securely guide the shutter in movement without regard to the position for its movement.

According to the disk cartridge of the invention, the shutter has a width greater than that of the window section such that the opposite side edge portions overlap the upper surface of the casing when the shutter is in the closed position, and the pair of retaining spring bearings and the pair of movable spring bearings are arranged so as to be situated in regions such that shutter and the casing overlap each other when the shutter is in the closed position. The movable spring bearings and the fixed spring bearings are situated with an offset in a direction perpendicular to the moving direction of the shutter.

According to the disk cartridge of the invention, moreover, the casing includes guide surfaces located individually in the spring storing sections and adapted individually to guide the respective movable ends of the shutter springs to predetermined positions with respect to the retaining spring bearings corresponding thereto when the shutter moves from the open position to the closed position.

According to the disk cartridge of the invention, furthermore, the fixed spring bearings, retaining spring bearings, and movable spring bearings individually have guide surfaces, which face the aperture portions and decline toward the spring storing sections so as to guide the respective fixed and movable ends of the shutter springs to the fixed spring bearings, retaining spring bearings, and movable spring bearings, individually, when the shutter springs are loaded into the spring storing sections through the aperture portions, individually.

According to the disk cartridge of the invention, moreover, the casing has a disk inlet/outlet port through which the recording medium can be loaded into and unloaded from the casing. The casing is provided with a cover member attached to the casing for movement between a closed position in which the cover member closes the disk inlet/outlet port and an open position in which the cover member allows the disk inlet/outlet port to open, whereby the recording medium can be taken out of the casing.

The disk cartridge according to the invention further comprises disk take-out detecting means for revealing that the recording medium has been taken out at least once from the casing. This disk take-out detecting means includes a take-out indicator hole formed in the casing and a detection member provided in the casing so as to be fitted in the indicator hole and adapted to be removed from the indicator hole when the cover member is moved to the open position thereof.

According to the disk cartridge of the invention, furthermore, the casing has a first detection hole for indicating inhibition or permission of writing of information in the recording medium, a second detection hole for indicating the direction of the recording medium, a third detection hole in reserve, and a take-out indicator hole for indicating that the recording medium has been taken out at least once from the casing. The first to third detection holes are arranged side by side on a first straight line parallel to one side edge of the casing, and the take-out indicator hole is located on a second straight line that extends at right angles to the first straight line and passes through the second detection hole.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 1 to 21 show a disk cartridge according to a first embodiment of the present invention, in which:

FIG. 1 is a perspective view of the disk cartridge with its shutter closed;

FIG. 2 is an exploded perspective view of the disk cartridge;

FIG. 3 is a perspective view of the disk cartridge with the shutter open;

FIG. 4A is an enlarged plan view of the front end portion of a half-casing of the disk cartridge;

FIG. 4B is an enlarged view of a fixed spring bearing;

FIG. 5 is an exploded perspective view showing a bridge section of a casing of the disk cartridge;

FIG. 6 is a front view of the casing;

FIG. 7 is a perspective view showing the bridge section of the casing;

FIG. 8 is a perspective view showing the inside of the shutter of the disk cartridge;

FIG. 9 is a sectional view taken along line IX—IX of FIG. 8;

FIG. 10 is a plan view showing the front end portion of the disk cartridge with the shutter closed;

FIG. 11 is a perspective view showing the relative positions of retaining spring bearings of the casing and movable spring bearings of the shutter with the shutter in its closed position;

FIG. 12 is a sectional view taken along line XII—XII of FIG. 10;

FIG. 13 is a plan view showing the front end portion of the disk cartridge with the shutter moved to an open position;

FIG. 14 is a perspective view showing the way guide protrusions of the shutter and guide grooves of the casing engage one another as the shutter moves from the closed position to the open position;

FIG. 15 is a sectional view taken along line XV—XV of FIG. 13;

FIG. 16 is a front view of the disk cartridge with the shutter in the closed position;

FIG. 17 is a plan view showing the front end portion of the half-casing and a pair of shutter springs with the shutter in the closed position;

FIG. 18 is a perspective view showing the relative positions of the retaining spring bearings of the casing and the movable spring bearings of the shutter with the shutter in its closed position and the way of engagement between the spring bearings and the shutter springs;

FIG. 19 is a perspective view showing the relative positions of the retaining spring bearings of the casing and the movable spring bearings of the shutter reached when the shutter moves from the closed position to the open position and the way of engagement between the spring bearings and the shutter springs;

FIG. 20 is a front view of the disk cartridge with the shutter in the open position;

FIG. 21 is a plan view showing the front end portion of the half-casing and the pair of shutter springs with the shutter moved to the open position;

FIGS. 22 to 31 show a disk cartridge according to a second embodiment of the invention, in which:

FIG. 22 is a perspective view of the disk cartridge;

FIG. 23 is a plan view of the disk cartridge;

FIG. 24 is a cutaway plan view of the disk cartridge;

FIG. 25 is a plan view of a cover member of the disk cartridge;

FIG. 26 is a sectional view taken along line XXVI—XXVI of FIG. 23;

FIG. 27 is a plan view showing a support section for a detecting pin;

FIG. 28 is an enlarged plan view showing a part of the cover member;

FIG. 29 is a sectional view taken along line XXIX—XXIX of FIG. 28;

FIG. 30 is a sectional view of an optical disk;

FIG. 31 is a plan view of the optical disk;

DETAILED DESCRIPTION OF THE INVENTION

A disk cartridge according to an embodiment of the present invention will now be described in detail with reference to the accompanying drawings.

Figure 1:
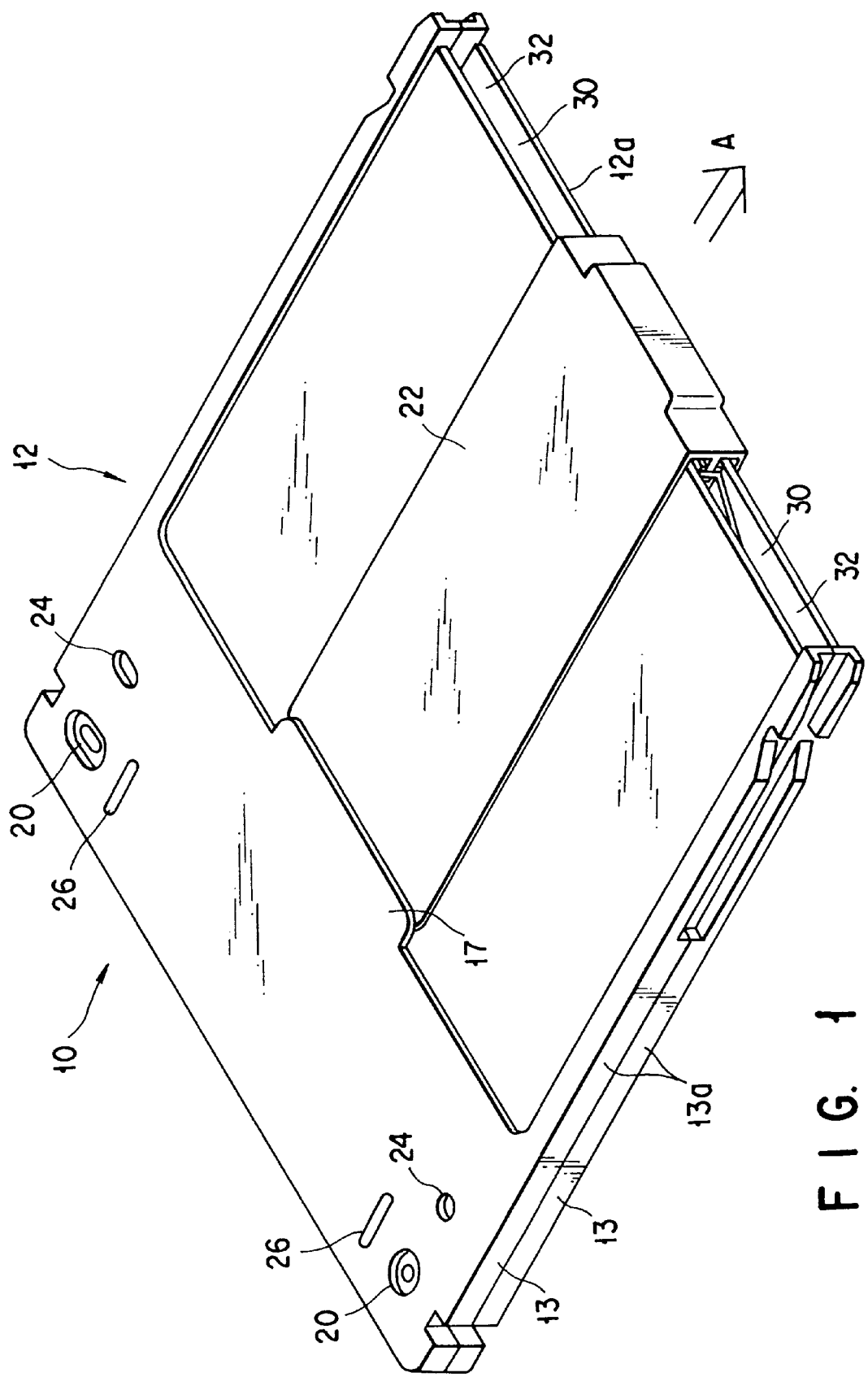
Figure 2:
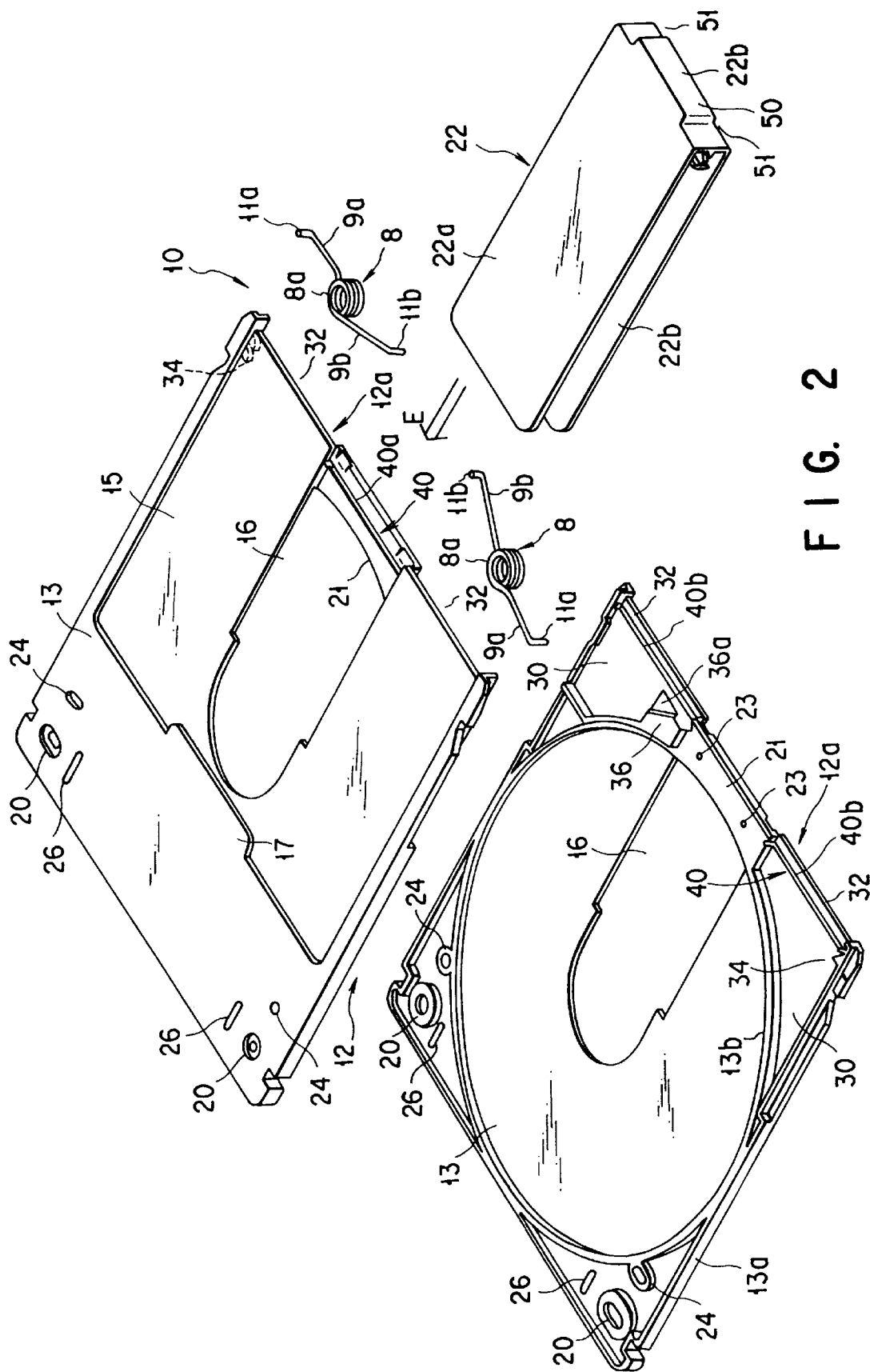
Figure 3:
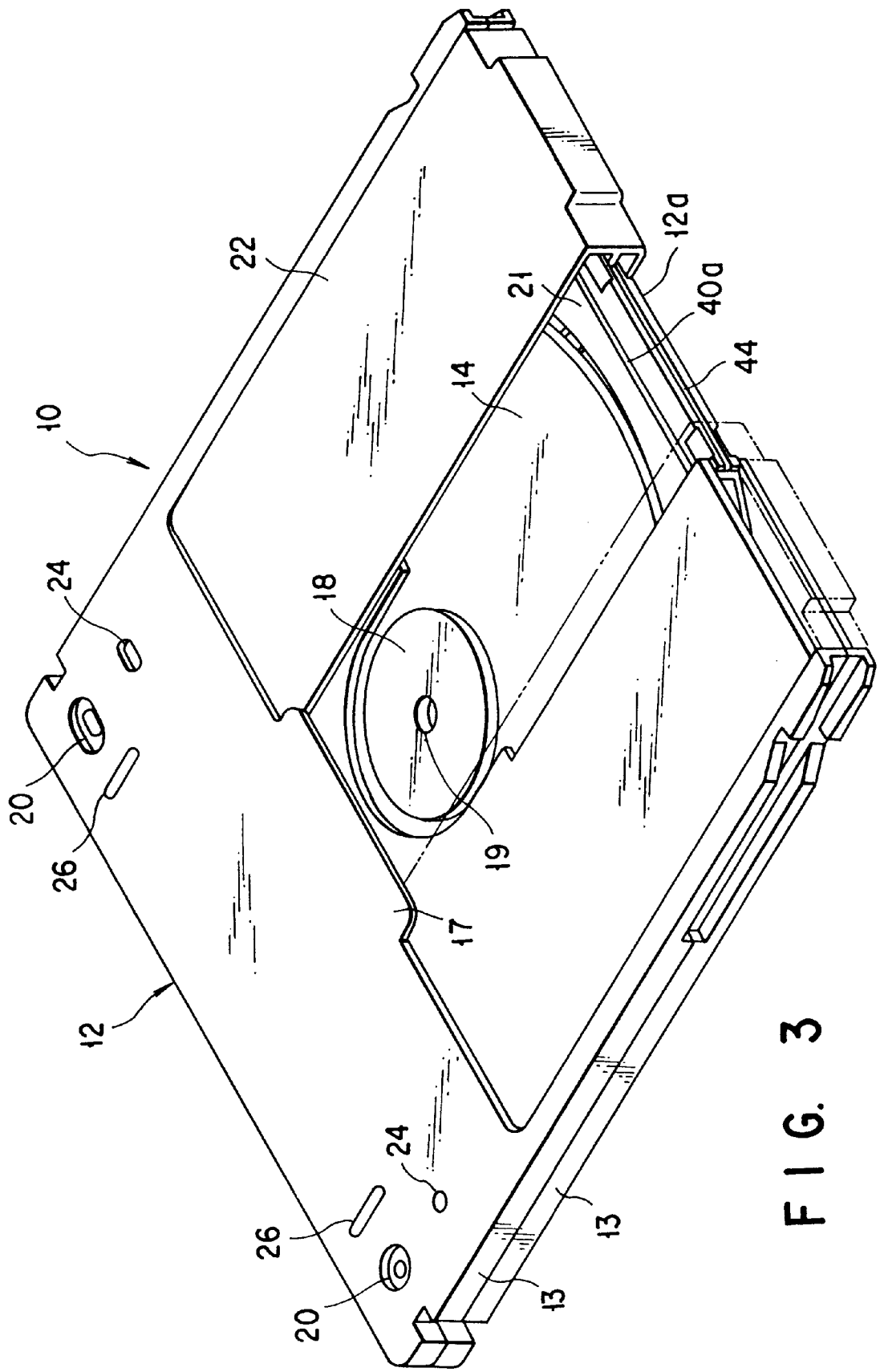

Referring first to FIGS. 1 to 3, the general arrangement of the present embodiment will be described in brief. A disk cartridge 10 according to the present embodiment comprises a flat rectangular casing 12, which contains an optical disk 14 for use as an information recording medium, having a recording/reproducing surface on either side, for example. The casing 12 is formed by abutting a pair of half-casings 13 together.

Two principal surfaces, upper and lower, of the casing 12 are formed individually having window sections 16 for access to the optical disk 14, which face each other. Each window section 16 extends substantially from the center of the casing 12 to a region near a front end face 12a of the casing 12 in a loading direction A for the disk cartridge 10.

A hub 18 having a center hole 19 is mounted on the central portion of the optical disk 14 that is contained in the casing 12. The hub 18 and a part of each surface of the optical disk 14 are exposed through each corresponding window section 16.

The casing 12 is provided with an integral double-sided shutter 22, which can be slid to open or close the window sections 16. The shutter 22 has a U-shaped cross section, and is attached to the casing 12 so as to hold both surfaces of the casing 12 from the side of the front end face 12a. The shutter 22 is slidable in a direction parallel to the front end face 12a of the casing 12, between a closed position in which it closes the window sections 16, as shown in FIG. 1, and two open positions on either side of the closed position, in which the shutter 22 allows the window sections 16 to open, as indicated by full line and two-dot chain line, individually, in FIG. 3. As mentioned later, moreover, the shutter 22 is continually urged toward the closed position by two shutter springs 8 that are arranged individually on the opposite sides of the window sections 16 within the casing 12.

The following is a detailed description of arrangements of individual components of the disk cartridge 10. As shown in FIGS. 1 and 2, the paired half-casings 13 of the casing 12 have the same shape and structure except for some parts, and are joined together with their respective inner surfaces reflectedly facing each other. Each half-casing 13 has the window section 16 for access. A shallow rectangular recess 15 is formed in that region of the surface of each half-casing 13 within which the shutter 22 slides, and the window section 16 is formed inside this recess. Further, each half-casing 13 has a stopper projection 17, which projects from the central portion of the rear end of the recess 15 to a position near the window section 16. As mentioned later, the projection 17 can engage a free end portion of the shutter 22, thereby holding the shutter in the recess 15.

A bridge section 21 is formed in the central portion of the front end of each half-casing 13, extending across the window section 16 and facing the front end of the window section. A pair of fitting holes 23 are formed in the inner surface of the bridge section 21 of one of the half-casings 13, while a pair of protrusions (not shown) to be fitted individually in the holes 23 are formed on the bridge section 21 of the other half-casing 13. The two half-casings 13 are constructed substantially in the same manner except for the fitting holes 23 in the one and the protrusions on the other.

Two sets of mounting holes 20, reference location holes 24, and detection holes 26 are formed individually at the opposite corners of the rear end portion of each half-casing 13. Operating pieces (not shown) for light protection switching are slidably fitted in their corresponding mounting holes 20. When the optical disk cartridge is loaded into an optical disk drive (not shown), protuberances on the disk drive side are passed individually through the location holes 24, whereby the disk cartridge is positioned with respect to the disk drive. The detection holes 26 serve to detect loading of the disk drive with the disk cartridge.

As seen from FIGS. 2, 4A and 4B, a rib 13a of a given height is formed on the inner surface of each half-casing 13, covering all its outer edges except the front edge portion. The rib 13a constitute two opposite side walls and an a rear wall of the casing 12. Formed integrally on the inner surface of each half-casing 13, moreover, is a ring-shaped rib 13b that defines a space in which the optical disk 14 is contained.

On the opposite sides of the front end portion of each window section 16, the ribs 13a and 13b and the bridge section 21 define a pair of spring storing sections 30 that can store the shutter springs 8, individually. Each spring storing section 30 includes an aperture portion 32 that opens in the front end face 12a of the casing 12 on each side of the bridge section 21.

A fixed spring bearing 34 protrudes from the inner surface of one side wall of each half-casing 13, and is situated in its corresponding spring storing section 30 in the vicinity of the aperture portion 32. The spring bearing 34 is hook-shaped, and has a slope 34a that declines from the inner surface side of the side wall of the half-casing 13 toward the spring storing section 30 and rearward.

In the other spring storing section 30, moreover, a projection 36 is formed in the vicinity of the bridge section 21. A guide surface 36a is formed on the upper surface of the projection 36, that is, on the side where the paired half-casings 13 face each other when they are joined together. The guide surface 36a declines toward the aperture portion 32 and the inner surface of each half-casing 13. As mentioned later, the guide surface 36a guides an arm of its corresponding shutter spring 8 as the spring returns from its deformed position to its initial position, that is, to a position such that the shutter 22 is in the closed position.

Figure 5:
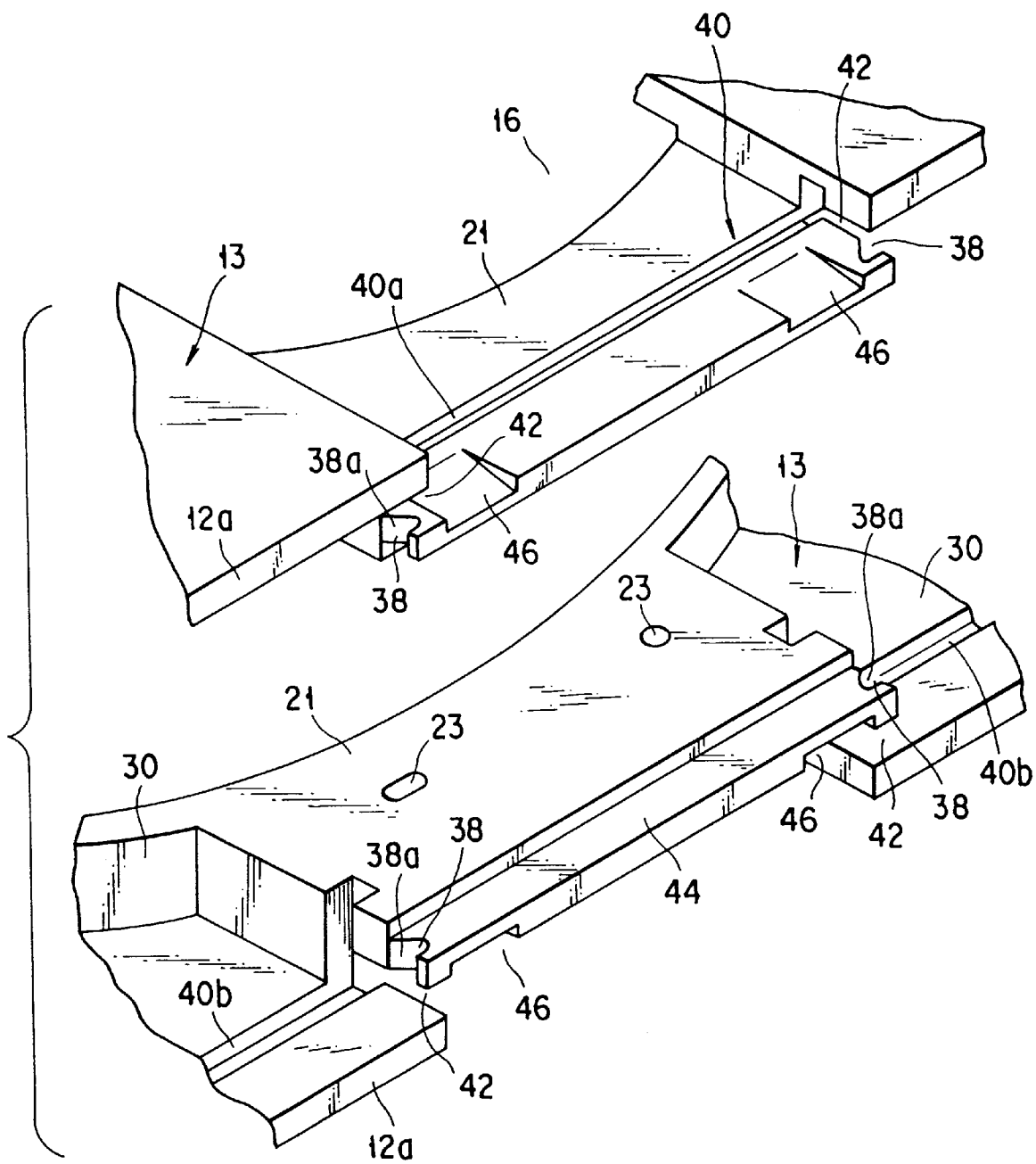

As shown in FIGS. 2, 4A and 5, a pair of retaining spring bearings 38, right and left, are formed individually on the opposite end portions of the bridge section 21 in the longitudinal direction. Each spring bearing 38 is formed of a recess that opens toward its opposite spring storing section 30, and has a slope 38a that declines toward its corresponding spring storing section 30 and toward the back of each half-casing 13. Each retaining spring bearing 38 and its opposite fixed spring bearing 34 are arranged with a slight offset in the longitudinal direction of the half-casing 13, that is, in the loading direction A, such that they can be prevented from interfering with each other when the shutter 22 is moved to an open position.

Further, each half-casing 13 is formed having a guide groove 40 that extends along its front end face 12a and is situated close to the front end face. The groove 40, which serves to guide the shutter 22 in sliding motion, includes a first portion 40a formed on the outer surface of the bridge section 21 and a pair of second portions 40b formed on the inner surface of the half-casing 13 and situated individually in the spring storing sections 30.

The first portion 40a extends covering the overall length of the bridge section 21, and its opposite ends communicate with their corresponding spring storing sections 30. Each second portion 40b is aligned straight with the first portion 40a, extends from its corresponding side wall of the half-casing 13 to the bridge section 21, and communicates with the first portion 40a.

The outer surface of the bridge section 21 is situated on the lower level than that of any other outer surface of the half-casing 13. Formed individually at the boundaries between the opposite ends of the front end portion of the bridge section 21 and their corresponding spring storing sections 30 are slits 42 that extend up to the guide groove 40. The respective end portions of the first and second portions 40a and 40b of the groove 40 vertically face one another in opposite directions with the slits between them.

Formed on the inner surface of the front end portion of the bridge section 21 is a moving groove 44, which extends along the front end face 12a of the half-casing 13 and opens in the front end face. Formed on the outer surface of the bridge section 21, on the other hand, are a pair of attachment guide grooves 46 that extend close to the first portion 40a of the guide groove 40 from the front end of the bridge section. Each attachment guide groove 46 declines from the side of the guide groove 40a toward the front end the bridge section 21.

The pair of half-casings 13 thus constructed are joined together by being butted against each other with their respective inner surfaces opposed. At the same time, the protrusions on the bridge section 21 of the other half-casing 13 is elastically fitted into their corresponding fitting holes 23 in the one half-casing 13, whereby the two half-casings 13 are kept bonded together.

With the two half-casings 13 bonded in this manner, the spring storing sections 30 are formed individually on the opposite sides of the bridge sections 21, as shown in FIGS. 6 and 7. The fixed spring bearings 34 are arranged on the respective inner surfaces of the opposite side walls, right and left, of the casing 12, and project into their corresponding spring storing sections 30. In each spring storing section 30, the slanting guide surface 36a for guiding the arm of its corresponding shutter spring is formed in the vicinity of each bridge section 21.

The retaining spring bearings 38, which are formed individually on the two bridge sections 21, are aligned with one another at the end portions of the bridge sections, and face their corresponding spring storing sections 30. Each end portion of the moving groove 44 of each bridge section 21 extends between its corresponding two retaining spring bearings 38 that face each other, and communicates with its corresponding spring storing section 30. Further, each attachment guide groove 46 formed on the one bridge section 21 faces its corresponding attachment guide groove 46 formed on the other bridge section 21.

Figure 8:
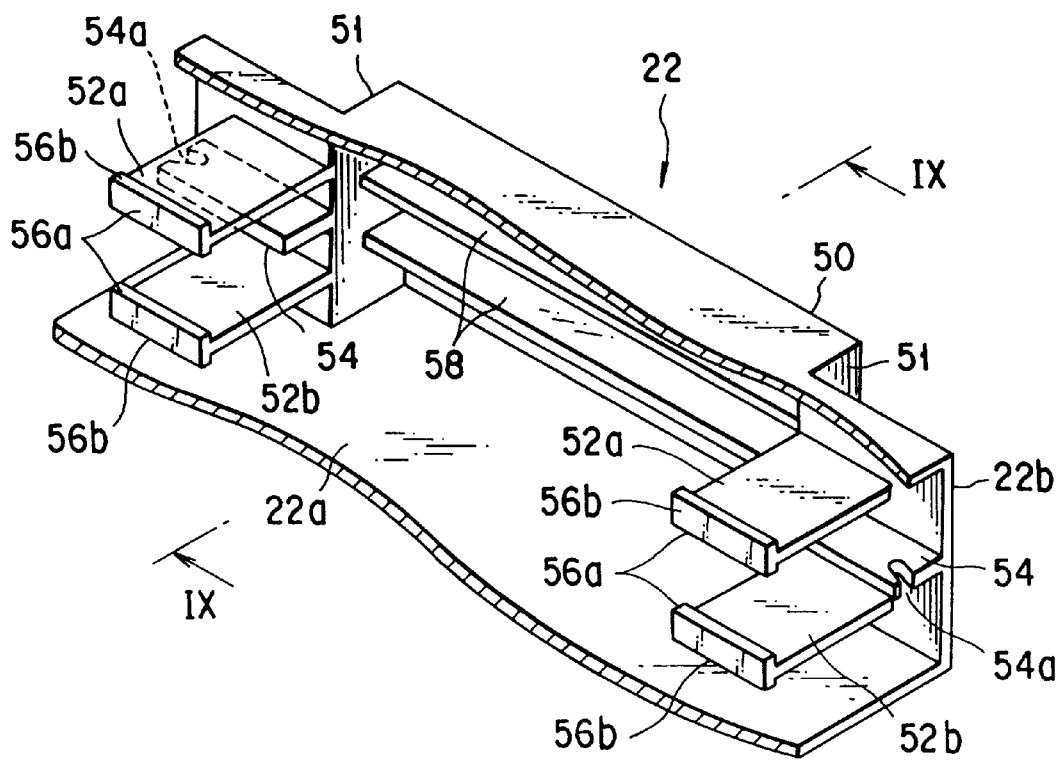

As shown in FIGS. 2 and 8, the shutter 22 includes a pair of shielding plates 22a, each in the form of an elongate rectangular structure large enough to close each window section 16 of the casing 12, and a connecting plate 22b that connects the shielding plates. The shielding plates 22a face parallel to each other with a given space between them, while the connecting plate 22b extends at right angles to the shielding plates and connects the respective first ends of the shielding plates.

Figure 9:
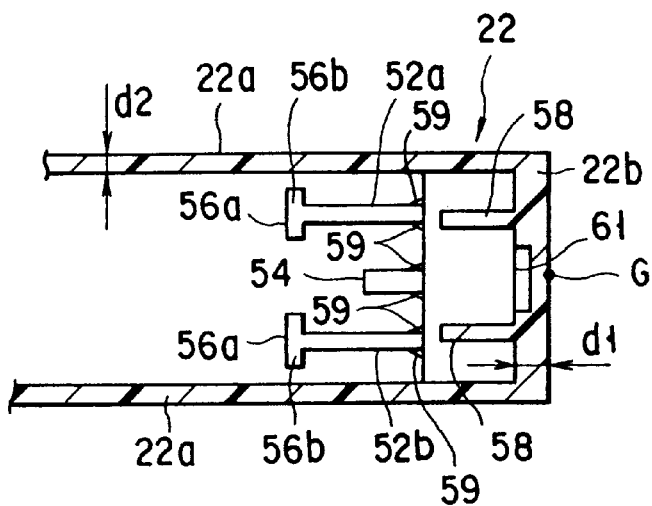

As shown in FIGS. 2, 8 and 9, the connecting plate 22b of the shutter 22 has a hollow projection 50 in the central portion with respect to its transverse direction. The projection 50 defines stepped portions 51, which can engage a sliding pin 69 (see FIG. 21) of a shutter sliding mechanism of the optical disk drive (not shown) for sliding the shutter 22.

Further, the shutter 22 is provided with two pairs of guide protrusions 52a and 52b, right and left, and a pair of movable spring bearings 54. More specifically, one pair of guide protrusions 52a and 52b and one movable spring bearing 54 are arranged on the inner surface of one end portion of the connecting plate 22b in the transverse direction, while the other pair of guide protrusions 52a and 52b and the other movable spring bearing 54 are arranged on the inner surface of the other end portion of the plate 22b in the transverse direction.

The guide protrusions 52a and 52b, which are in the form of a plate each, project parallel to the shielding plates 22a from the inner surface of the connecting plate 22b, and face one another at a distance substantially equal to the thickness of the bridge sections 21 of the casing 12. Each guide protrusion 52a includes a projection 56a (first projection) that projects at right angles from its extended end toward its corresponding guide protrusion 52b and a projection 56b (second projection) that projects at right angles from its extended end toward its opposite shielding plate 22a. The first and second projections 56a and 56b extend parallel to the connecting plate 22b, that is, in the sliding direction of the shutter 22. Thus, the general profile of each guide protrusion 52a is substantially T-shaped.

Likewise, each guide protrusion 52b includes a projection 56a (first projection) that projects at right angles from its extended end toward its corresponding guide protrusion 52a and a projection 56b (second projection) that projects at right angles from its extended end toward its opposite shielding plate 22a. The first and second projections 56a and 56b extend parallel to the connecting plate 22b, that is, in the sliding direction of the shutter 22. Thus, the general profile of each guide protrusion 52b is substantially T-shaped.

Also, each movable spring bearing 54 is in the form of a plate, projecting parallel to the shielding plates 22a from the inner surface of the connecting plate 22b so as to be situated between its corresponding guide protrusions 52a and 52b. Each bearing 54 has a recess 54a with a plate-shaped protrusion. The recess 54a has substantially the same size and shape as each retaining spring bearing 38 of the casing 12.

The shutter 22, having the construction described above, is integrally formed of a resin. The thickness (d1) of the connecting plate 22b is about twice the thickness (d2) of each shielding plate 22a. In order to increase the strength of the connecting plate 22b, two ribs 58 are formed integrally on the inside of the projection 50 so as to extend in the longitudinal direction of the connecting plate 22b. Moreover, paddings 59 are formed individually on the respective proximal end portions of the guide protrusions 52a and 52b and the movable spring bearings 54 in order to improve their strength and accuracy in location.

Further, a recess 61 is formed in the inner surface of the projection 50 of the connecting plate 22b. The recess 60 faces a gate position G in which the shutter 22 is formed by injection molding, and serves to homogenize the flow of the resin during the injection molding.

Constructed in this manner, the shutter 22 can be attached to the casing 12 by forcing the respective free ends of the shielding plates 22a to be fitted onto the casing 12 from the side of the front end face 12a thereof, in the direction of arrow E, as shown in FIG. 2. In doing this, the guide protrusions 52a and 52b of the shutter 22 are aligned with their corresponding attachment guide grooves 46 on the bridge sections 21. Thus, each pair of guide protrusions 52a and 52b hold the bridge sections 21 from above and below as they move along their corresponding guide grooves 46.

As the shutter 22 is further pushed in the direction of arrow E, the respective inside projections 56a of the guide protrusions 52a and 52b engage the first portions 40a of the guide grooves 40 on their corresponding bridge sections 21, individually, and the connecting plate 22b adjoins the front end face 12a of the casing 12. The pair of movable spring bearings 54, which protrude from the inner surface of the connecting plate 22b, are slidably inserted into the moving groove 44 on the front end face of each bridge section 21.

Each shielding plate 22a moves on its corresponding outer surface of the casing 12, and its free end is interposed and held between the bottom of the recess 15 in the surface of the casing 12 and the stopper projection 17. By doing this, the shutter 22 is attached to the casing 12.

When the shutter 22 is in the closed position, as shown in FIG. 10, the two window sections 16 of the casing 12 are closed individually by the shielding plates 22a of the shutter. The width of each shielding plate 22a is a little greater than that of each window section 16, so that the opposite side edge portions of each plate 22a overlap the top wall of the casing 12.

When the shutter 22 is in the closed position, as shown in FIGS. 10 and 11, moreover, the respective recesses 54a of the pair of movable spring bearings 54 are aligned with the retaining spring bearings 38 that are arranged at the opposite end portions of the bridge sections 21 of the casing 12, individually. Further, these aligned spring bearings 54 and 38 are bound to be situated within overlapping regions 60 between the shutter 22 and the top wall of the casing 12.

When the shutter 22 is in the closed position, as shown in FIGS. 10 and 12, the guide protrusions 52a and 52b of the shutter hold the bridge sections 21 of the casing 12 from both sides. Also, the respective inside projections 56a of the protrusions 52a and 52b are slidably in engagement with the respective first portions 40a of the guide grooves 40, individually. Thus, the guide protrusions 52a and 52b guide the shutter 22 in movement in a manner such that their respective inside projections 56a slide individually in the first portions 40a as the protrusions move along the bridge sections 21.

Figure 13:
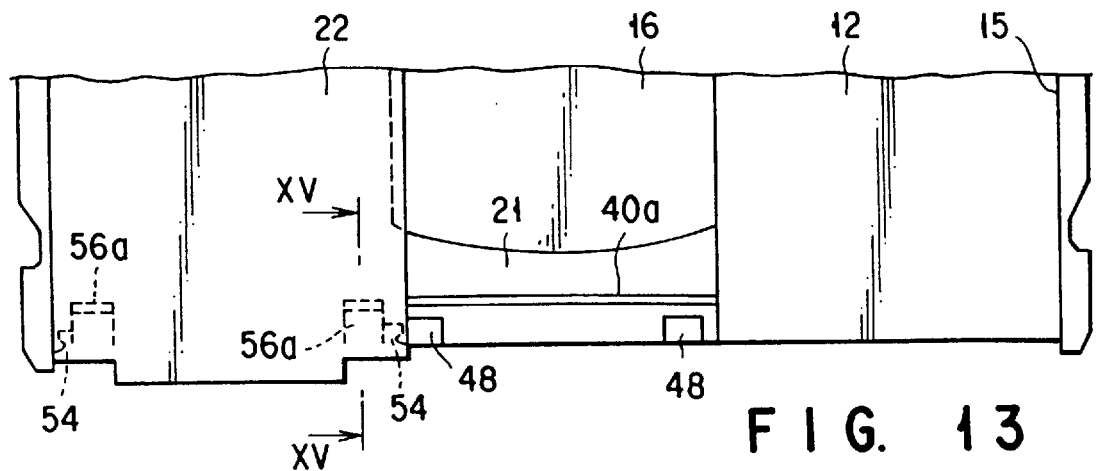

When the shutter 22 is moved from the closed position to one open position, as shown in FIG. 13, on the other hand, both the shielding plates 22a of the shutter get off their corresponding window sections 16, thereby allowing the window sections to open. As this is done, the movable spring bearings 54 of the shutter 22 come off the moving groove 44 of the bridge section 21, and move into the open-side spring storing sections 30.

Figure 14:
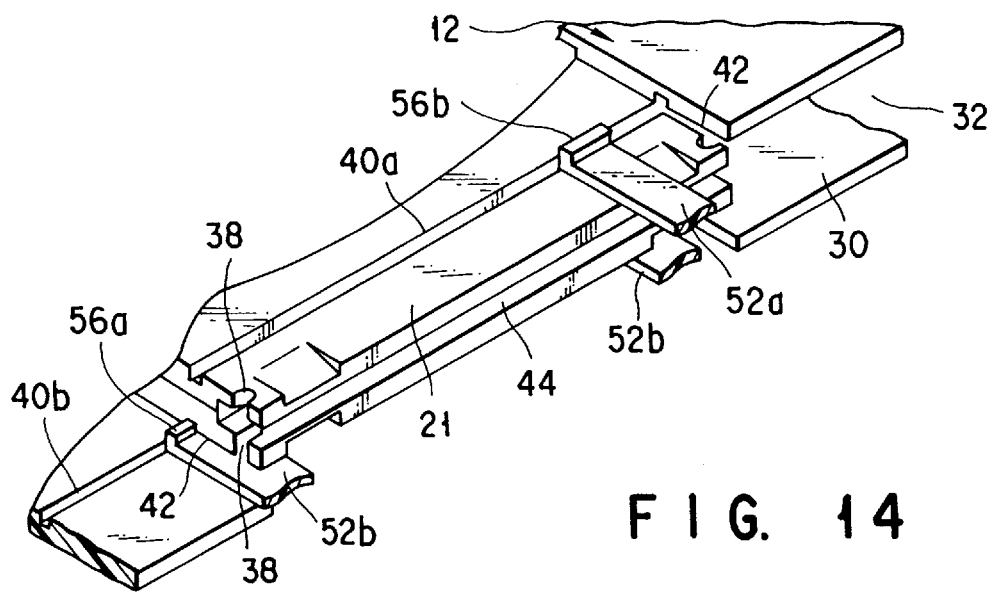
Figure 15:
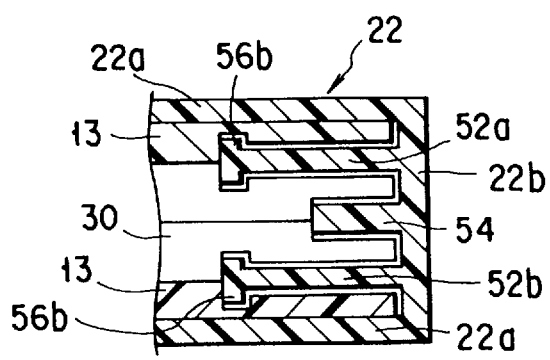

After the projections 56a slide in the respective first portions of their corresponding guide grooves 40, as shown in FIGS. 14 and 15, the guide protrusions 52a and 52b of the shutter 22 move into the open-side spring storing sections 30 through the slit 42 on the same side. As this is done, the inside projections 56a of the guide protrusions 52a and 52b get off the first portions 40a, and instead, the outside projections 56b engage their corresponding second portions 40b of the guide grooves 40. Thereafter, the projections 56b of the guide protrusions 52a and 52b move in the second portions 40b so that the shutter 22 reaches the open position.

Thus, the guide protrusions 52a and 52b guide the shutter 22 in movement in a manner such that their respective outside projections 56b slide individually in the second portions 40b in the open-side spring storing sections 30 as the protrusions move in the holding sections 30.

As shown in FIGS. 2, 16, 17 and 18, the pair of shutter springs 8 in the spring storing sections 30 on the opposite sides of the window sections 16 of the casing 12 have the same construction, and are arranged symmetrically with respect to a point. More specifically, each shutter spring 8 includes a coil portion 8a and two arms 9a and 9b that extend in substantially opposite directions from the opposite ends of the coil portion. The distal end portion of the one arm 9a is bent toward the coil portion 8a at right angles, thus forming a fixed end 11a. Likewise, the distal end portion of the other arm 9b is bent toward the coil portion 8a at right angles, thus forming a movable end 11b.

The shutter springs 8, constructed in this manner, are fitted individually into the spring storing sections 30 through the aperture portions 32 opening in the front end face 12a of the casing 12, with the shutter 22 held in the closed position. More specifically, the shutter 22 is first moved to the closed position, and the movable spring bearings 54 of the shutter 22 are aligned individually with their corresponding retaining spring bearings 38 formed on the bridge sections 21. In this state, the arms 9a and 9b of each shutter spring 8 are slightly elastically deformed toward each other, and the spring 8 is then inserted, with its coil portion 8a ahead, into its corresponding spring storing section 30 through the aperture portion 32 thereof.

Subsequently, with the fixed end 11a of each shutter spring 8 held on the guide surface 34a of its corresponding fixed spring bearing 34 formed on the casing 12, the movable end 11b is caused to engage its corresponding movable spring bearing 54 and the guide surfaces 38a of the corresponding retaining spring bearings 38 that are in alignment with one another. When the arms 9a and 9b are released from the force of pressure in this state, they are caused to move away from each other by their own elasticity. As this is done, the fixed and movable ends 11a and 11b of the shutter spring 8 move along the guide surfaces 34a and 38a, respectively. Thereupon, the fixed end 11a engages its corresponding fixed spring bearing 34, while the movable end 11b engages its corresponding retaining spring bearings 38 of the bridge sections 21 and the corresponding movable spring bearing 54 of the shutter 22.

In this manner, the attachment of the pair of shutter springs 8 is finished. When the shutter 22 is in the closed position, as shown in FIGS. 16, 17 and 18, each movable spring bearing 54 of the shutter is aligned with its corresponding retaining spring bearings 38 of the casing 12, and the movable end 11b of each shutter spring 8 is in engagement with the spring bearings 54 and 38. Thus, the shutter 22 is urged from both sides to be held in the closed position by the two shutter springs 8.

In this case, the movable end 11b of each shutter spring 8 is in engagement with the retaining spring bearings 38 of the casing 12, as well as with the movable spring bearing 54. Accordingly, the shutter springs 8 can be prevented from applying an excessive urging force to the shutter 22, and the shutter 22 can be held in the closed position under pressure from the springs 8. Even in case the two shutter springs 8 vary in urging force due to variability in manufacture, therefore, the shutter 22 can be accurately held in the close position by means of the springs 8.

Figure 20:
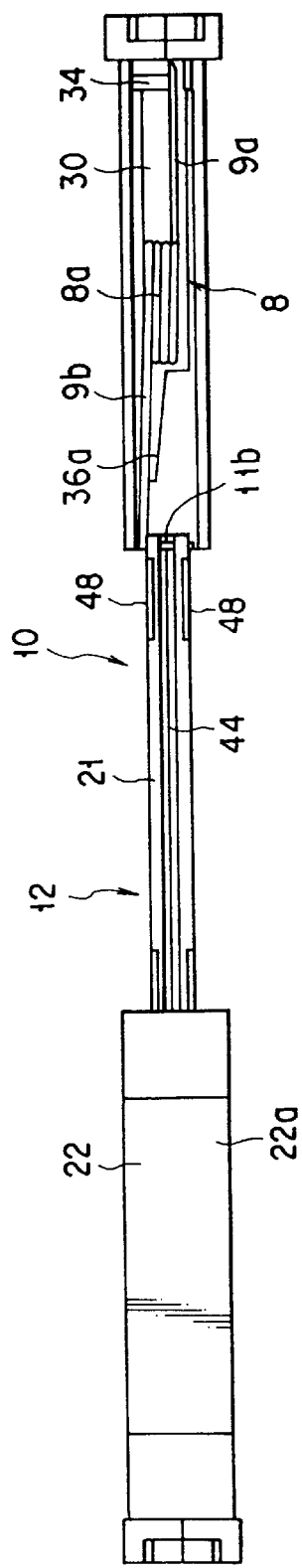
Figure 21:
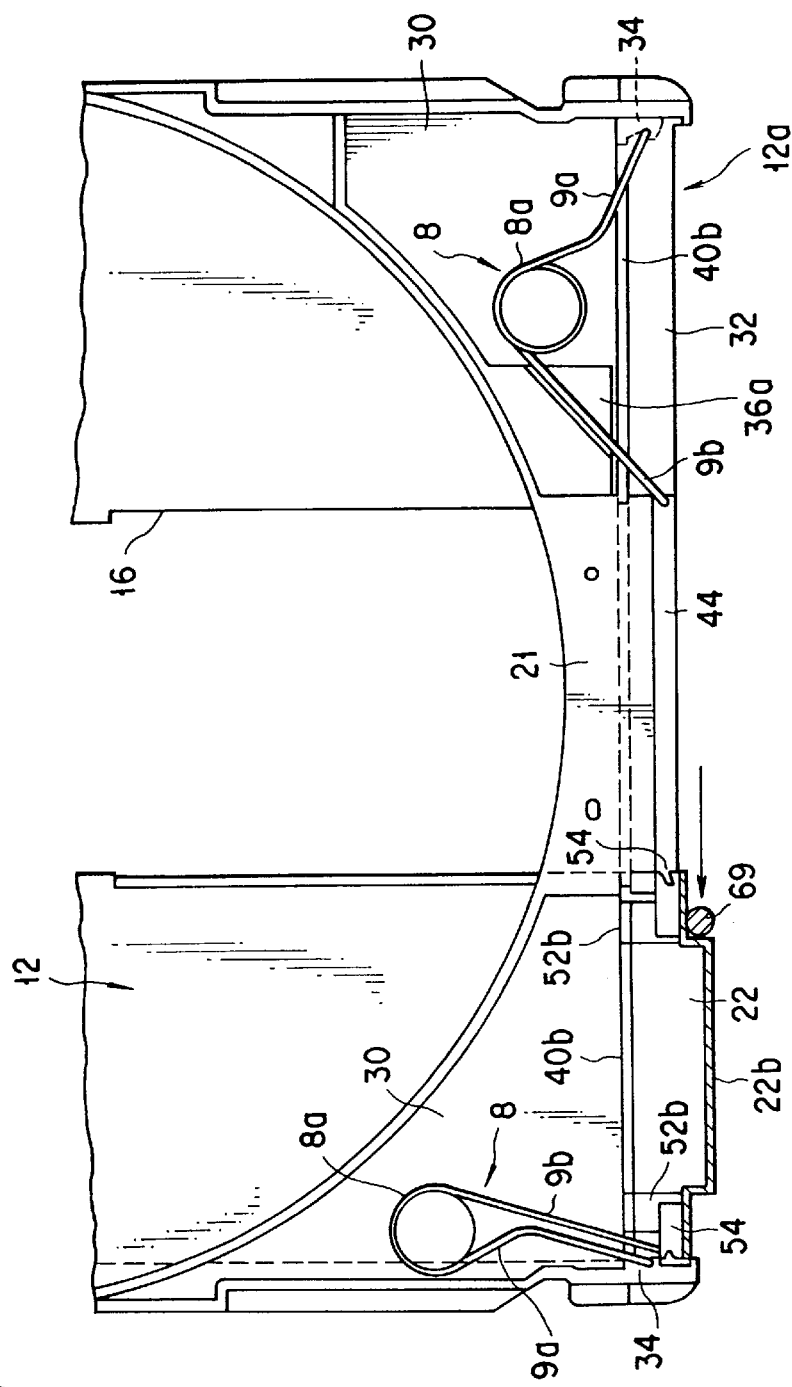

On the other hand, if the shutter 22 is moved from the closed position to either of the open positions as the sliding pin 70 of the shutter sliding mechanism of the optical disk drive (not shown) moves along the front end face 12a of the casing 12 and engages one of the stepped portions 51, as shown in FIGS. 19, 20 and 21, for example, that movable spring bearing 54 of the shutter 22 which is situated on the shutter-open side moves into the open-side spring storing section 30 from the position where it is in alignment with the retaining spring bearings 38 of the casing 12. In doing this, the spring bearing 54 presses the movable end 11b of the shutter spring 8 on the shutter-open side toward the open-side holding section 30, thereby separating it from the retaining spring bearings 38, without being disengaged from the movable end 11b. Further, the movable spring bearing 54 presses and moves the movable end 11b of the shutter spring 8 close to the fixed end 11a so that the shutter 22 reaches the open position.

Since the movable spring bearings 54 and the fixed spring bearings 34 are situated with an offset in the cartridge loading direction, the shutter 22 can be moved securely and smoothly to the open position without any interference between the bearings 54 and 34.

On the other hand, that movable spring bearing 54 of the shutter 22 which is situated on the side opposite to the shutter-open side separates from the retaining spring bearings 38 of the casing 12 as the shutter 22 moves in the aforesaid manner, and moves along the moving groove 44 of the bridge sections 21 toward the open-side spring storing section 30.

As the movable spring bearing 54 separates from the retaining spring bearings 38, it also separates from the movable end 11b of the shutter spring 8 on the opposite side. Accordingly, the movable end 11b of the opposite-side shutter spring 8 is kept in engagement with the retaining spring bearings 38 of the casing 12. In this manner, the shutter spring 8 on the side opposite to the shutter-open side is kept in its initial state.

Thus, the shutter 22 can be moved to one of the open positions by means of the sliding pin 70 under the urging force of the shutter spring 8 on the shutter-open side alone, without being influenced by the opposite-side shutter spring 8 at all.

When the force of pressure having being applied to the shutter 22 by the sliding pin 70 is removed, the shutter 22 is pressed and moved to the closed position by the open-side shutter spring 8 in engagement therewith. When the shutter 22 is moved to the closed position, its movable spring bearings 54 are aligned with their corresponding retaining spring bearings 38 of the casing 12. Also, the movable end 11b of the open-side shutter spring 8, having been pressing the shutter 22, engages the retaining spring bearings 38 of the casing 12, whereupon the shutter 22 is restrained from being urged excessively. Thus, the shutter 22 is held in the closed position.

As the open-side shutter spring 8 is restored from its contracted state shown in FIG. 21 to its initial state shown in FIG. 17, that is, as the shutter 22 returns from the open position to the closed position, the arm 9b of the open-side shutter spring 8 is guided into a predetermined position by the guide surface 36a on the inner surface side of the casing 12 just before it is restored to its initial state. Accordingly, the movable end 11b of the arm 9b can always accurately engage the retaining spring bearings 38 of the casing 12 in position.

Even though the shutter spring 8 is more or less dislocated as the shutter 22 is opened or closed, therefore, it can be securely restored to the predetermined initial position every time the shutter returns from the open position to the closed position. Thus, the shutter spring can be prevented from slipping out of the casing 12 or being caught by something, so that the reliability of the structure can be improved.

The shutter 22 can be moved to the other open position in the same manner as aforesaid, but in the opposite direction.

According to the disk cartridge 10 constructed in this manner, the shutter 22 can be opened or closed in either direction and held in the closed position in the center with use of the simple structure that includes only the pair of shutter springs 8 on either side of the window sections 16.

Further, the disk cartridge 10 is composed of a minimum number of parts, including the guide casing 12, shutter 22, and shutter springs 8. The shutter 22 can be attached to the casing 12 by only being inserted into the casing from the front end side. Likewise, the shutter springs 8 can be attached to the casing 12 by only being inserted into the casing through the aperture portions 32. Thus, the cartridge 10 can be automatically assembled with ease.

According to the disk cartridge 10 constructed in this manner, moreover, the shutter 22 is opened or closed by means of only one of the paired shutter springs 8, depending on its opening direction. Thus, when the shutter 22 moves to the one open position, the movable end 11b of the shutter spring 8 on the shutter-open side is delivered from its corresponding retaining spring bearings 38 of the casing 12 to its corresponding movable spring bearing 54 of the shutter 22, while the movable end 11b of the other shutter spring 8 separates from its corresponding movable spring bearing 54 of the shutter 22 and is kept in engagement with its corresponding retaining spring bearings 38.

Accordingly, the shutter 22 can be opened or closed in engagement with only the open-side shutter spring 8 without being influenced by the other shutter spring 8. Thus, the shutter 22 can enjoy a sliding stroke long enough, and can be also applied to a disk cartridge that contains a large-diameter optical disk with a diameter of, e.g., about 120 mm.

According to the disk cartridge 10 constructed in the aforesaid manner, furthermore, the shutter 22 can be securely guided in movement although the aperture portions 32 through which the shutter springs 8 are inserted into the casing 12 are formed on either side of the bridge sections 21 at the front end portion of the casing.

Thus, when the guide protrusions 52a and 52b on the shutter 22 move on their corresponding bridge sections 21, they guide the shutter 22 in movement by having their respective inside projections 56a fitted individually in the first portions 40a of the guide grooves 40. When the guide protrusions 52a and 52b move in their corresponding aperture portions 32, they guide the shutter 22 in movement by having their respective outside projections 56b fitted individually in the second portions 40b of the guide grooves 40. Thus, the shutter 22 can be securely guided in movement to any of the predetermined positions by means of the guide protrusions 52a and 52b.

According to the present invention, as described in detail herein, there may be provided a disk cartridge capable of automatic assembly, in which the shutter can be opened or closed in either direction and securely held in its closed position with use of a simple structure that includes only a pair of shutter springs.

According to the invention, moreover, there may be provided a disk cartridge of simple construction, in which the shutter is urged by means of only one of paired shutter springs, depending on its opening direction, so that it can enjoy a long sliding stroke.

Besides, according to the disk cartridge of the invention, the pair of retaining spring bearings and the pair of movable spring bearings are situated in the regions where the shutter and the top surface of the casing overlap each other, so that the sliding stroke of the shutter can be lengthened.

According to the disk cartridge of the invention, furthermore, the movable spring bearings of the shutter and the fixed spring bearings are situated with an offset in a direction perpendicular to the moving direction of the shutter. When the shutter is opened, therefore, the movable spring bearings can be moved close to the fixed spring bearings without interfering with the same. Thus, the shutter 22 can be opened or closed smoothly.

According to the disk cartridge of the present invention, the casing has a guide surface in each spring storing section. The guide surface guides the movable end of the shutter spring that moves together with its corresponding movable spring bearing, from the fixed spring bearing side toward the retaining spring bearings, to a predetermined position compared to the retaining spring bearings as the shutter moves from one of the open positions to the closed position. Thus, the shutter spring returns to its predetermined initial position every time the shutter is closed, so that it can be prevented from slipping out of the casing or being caught by something.

According to the disk cartridge of the invention, moreover, the fixed spring bearings, retaining spring bearings, and movable spring bearings have their respective guide surfaces, which face the aperture portions and decline toward the spring storing sections. In loading each shutter spring into its corresponding spring storing section through the aperture portion, therefore, the fixed and movable ends of the spring, guided by the guide surfaces, can be caused securely to engage the fixed spring bearings, retaining spring bearings, and movable spring bearings.

Referring now to FIGS. 22 to 31, a disk cartridge according to a second embodiment of the present invention will be described in detail.

According to this second embodiment, a casing 12 of a disk cartridge 10 has a disk inlet/outlet port 64, through which an optical disk 14 can be loaded into or unloaded from the casing. More specifically, as shown in FIGS. 22 to 25, a rear end face 12b of the casing 12 is formed having the disk slot 64, which extends covering the overall length of the casing in the transverse direction. The slot 64 is opened or closed by means of a cover member 63, which will be mentioned later.

A circular location hole 24a and a slot-shaped alignment hole 24b are formed individually at the opposite corners of the rear end portion of each of half-casings 13 that constitute the casing 12. These holes 24a and 24b are used in positioning the disk cartridge 10 when the cartridge is set in an optical disk drive unit, which will be mentioned later.

Figure 22:
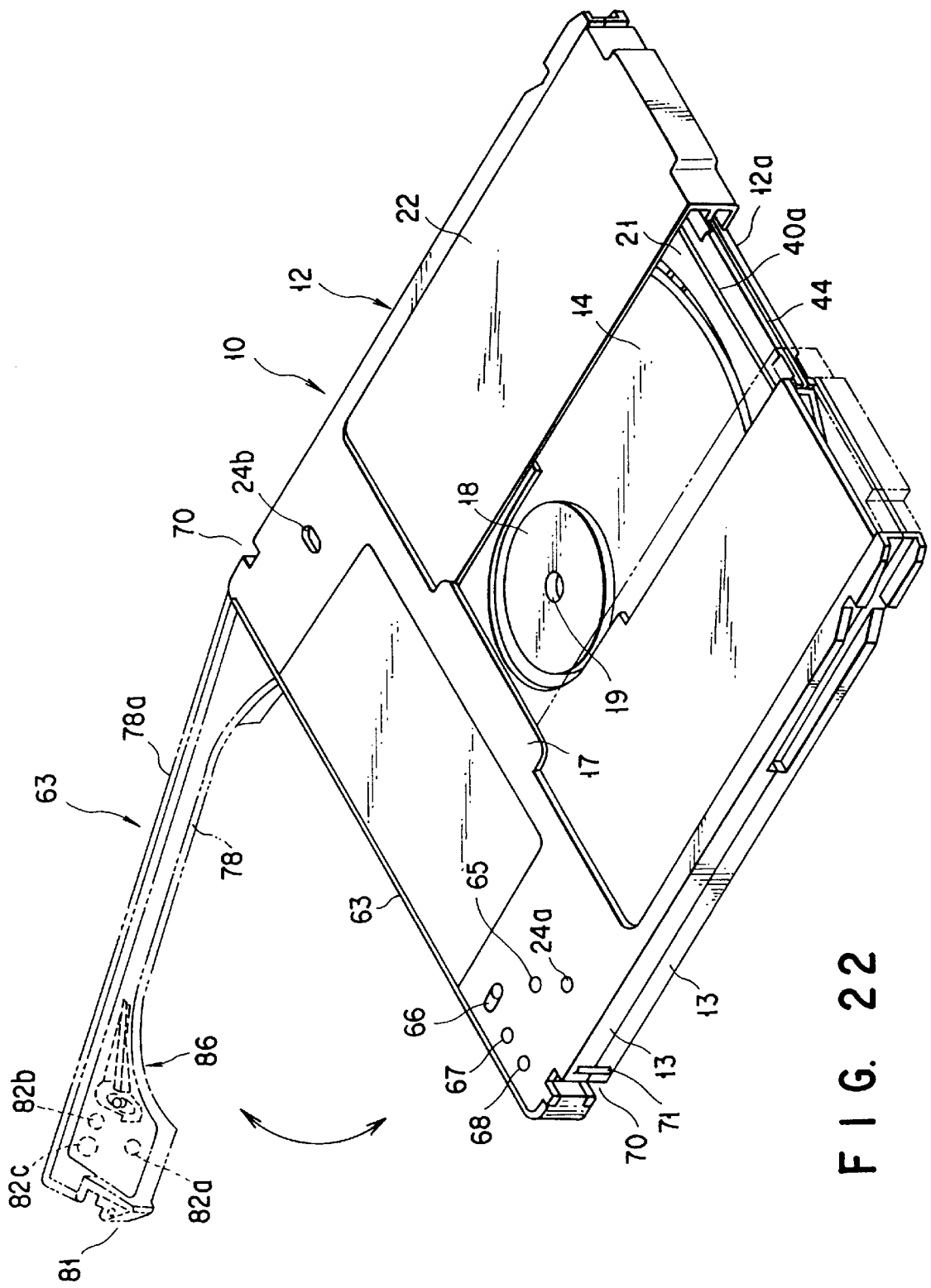
Figure 23:
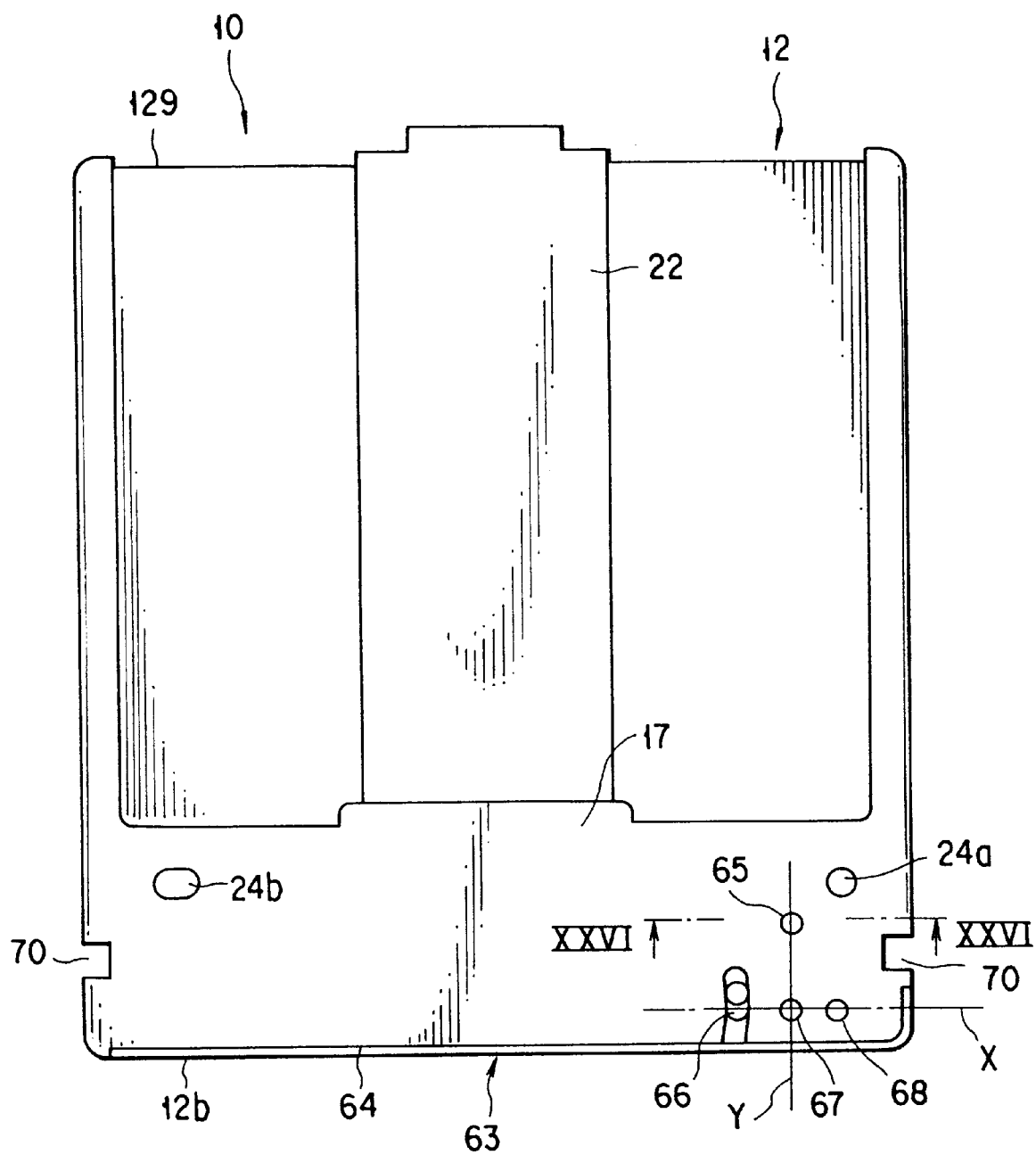

As shown in FIGS. 22 and 23, moreover, a disk take-out indicator hole 65 and first, second, and third detection holes 66, 67 and 68 are formed at the right-hand corners of the rear end portion of the principal surface of one half-casing 13. The indicator hole 65 indicates whether or not the optical disk 14 has been taken out at least once from the disk cartridge 10. The first detection hole 66 serves to detect the position of a write protector 86 (mentioned later) for mode change between a write inhibit mode and a write enable mode for disk data. The second detection hole 67 serves to detect an effective or noneffective surface of the disk cartridge 10. The third detection hole 68 is a spare hole that can be used for any other detection.

The first, second, and third detection holes 66, 67 and 68 are arranged at given intervals on a line X that extends parallel to the rear end edge of the casing 12. The take-out indicator hole 65 is located on a line Y that passes through the second detection hole 67 and crosses the line X at right angles thereto.

Figure 24:
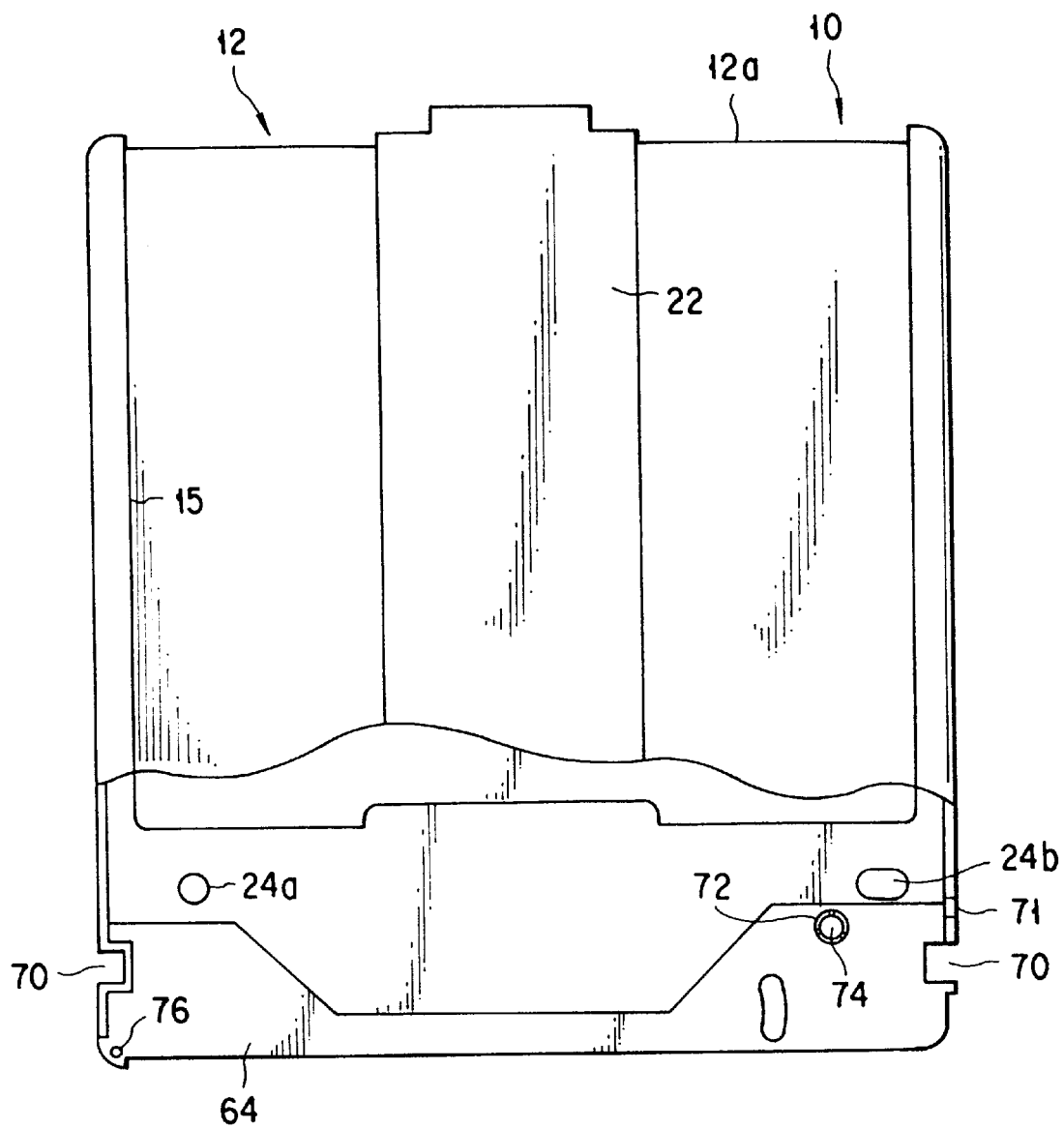
Figure 26:
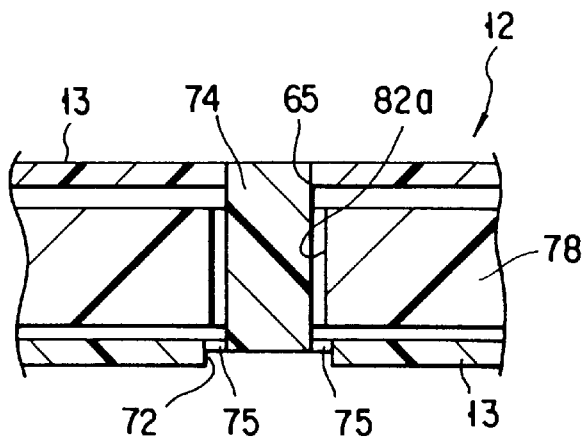
Figure 27:
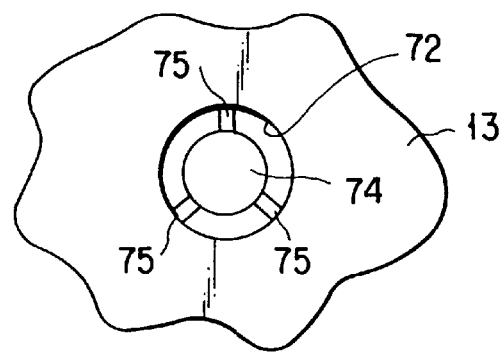

As shown in FIGS. 24, 26 and 27, the other half-casing 13 is formed having a retaining hole 72 that is in alignment with the take-out indicator hole 65. Also, this half-casing 13 is provided integrally with a cylindrical detection pin 74 for detecting a take-out of the optical disk 14. More specifically, one end portion of the pin 74 is inserted in the retaining hole 72 with a gap, and is connected to the half-casing 13 by means of a plurality of support legs 75, e.g., three in number. Each leg 75 is a slender structure that easily breaks. The half-casing 13, support legs 75, and detection pin 74 are integrally formed from a resin, the pin 74 extending at right angles to the inner surface of the half-casing. When the casing 12 is assembled, the other end portion of the detection pin 74 is inserted in the take-out indicator hole 65 in the first half-casing 13, thereby closing the hole 65.

As shown in FIGS. 22 to 24, gripper slots 70 are formed individually in the opposite side faces of the rear end portion of the casing 12. Grippers (not shown) of an autochanger mechanism (not shown) of the disk drive unit are fitted individually in the slots 70 so that the disk cartridge can be automatically changed by the autochanger.

A notch 71 is formed in one side wall of the casing 12 so as to adjoin its corresponding gripper slot 70. A locking claw 81 (mentioned later) of the cover member 63 can be fitted in the notch 71. Further, recesses 76 are formed individually in the inner surfaces of the casing 12 at that corner portion which is situated on the side opposite from the notch 71. Pivots of the cover member 63 can be fitted individually in the recesses 76 for rotation.

As shown in FIGS. 22 to 25, on the other hand, the cover member 63 is provided with a body 78 in the form of an elongate plate that has a length substantially equal to the width of the casing 12. Pivots 80 protrude individually from the opposite surfaces of the body 78 at one longitudinal end thereof. These pivots 80 are fitted individually in the recesses 76 that are formed in the inner surfaces of the casing 12. Thus, the cover member 63 is attached to the casing 12 so as to be rockable around the pivots 80 between a closed position (indicated by full line in FIGS. 22 and 23) in which it closes the disk inlet/outlet port 64 of the casing 12 and an open position (indicated by two-dot chain line in FIG. 22) in which it allows the slot 64 to open.

The body 78 has a rib 78a that projects on either side thereof and extends along one side edge of the body. In the closed position, the greater part of the body 78 is inserted into the casing 12 through the disk inlet/outlet port 64, and the rib 78a functions as a stopper by engaging the rear end edge of the casing 12.

The locking claw 81 capable elastic deformation is provided integrally on the other longitudinal end of the body 78. When the cover member 63 is in the closed position, the claw 81 engages the notch 71 of the casing 12, thereby locking the member 63 in the closed position. In this manner, the cover member 63 can be prevented from being unexpectedly swung open. The member 63 can be swung open by elastically deforming the locking claw 81 to remove it from the notch 71.

First, second, and third through holes 82a, 82b and 82c and an aperture 83 are formed in that end portion of the body 78 on the side of the locking claw 81. The holes 82a, 82b and 82c and the aperture 83 are located in positions where they face the take-out indicator hole 65, second detection hole 67, third detection hole 68, and first detection hole 66, respectively, of the casing 12 when the cover member 63 is in the closed position.

When the cover member 63 is swung open at no time, that is, when the optical disk 14 is not taken out once, after the disk cartridge is assembled, the detection pin 74 of the casing 12 is inserted in the first through hole 82a of the cover member 63, as shown in FIG. 26. When the cover member 63 is swung open in order to take out the optical disk 14 from the cartridge, the detection pin 74 is pressed so that the support legs 75 break. Thereupon, the pin 74, along with the cover member 63, is taken out of the casing 12. Thus, the take-out indicator hole 65 of the casing 12 is open thereafter, and communicates with the first through hole 82a of the cover member 63 when the member 63 is fixed. When the disk cartridge 10 is set in the optical disk drive unit, therefore, the drive unit can recognize through the indicator hole 65 and the hole 82a that the disk cartridge is one from which the optical disk 14 is taken out at least once.

A pair of rectangular recesses 84 are formed individually in the locking claw 81 on the cover member body 78 and that end portion of the body 78 on the side opposite from the claw 81. When the cover member 63 is fixed, these recesses 84 are situated in alignment with their corresponding gripper slots 70 of the casing 12.

Located in the aperture 83 of the body 78 is the write protector 86 for indicating the write inhibit or enable mode for data to be written in the optical disk 14 that is contained in the disk cartridge 10. The protector 86 is formed integrally with the body 78.

Figure 25:
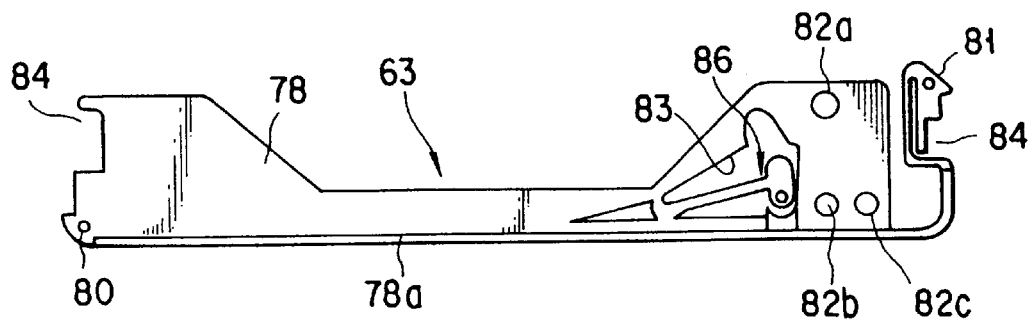
Figure 28:
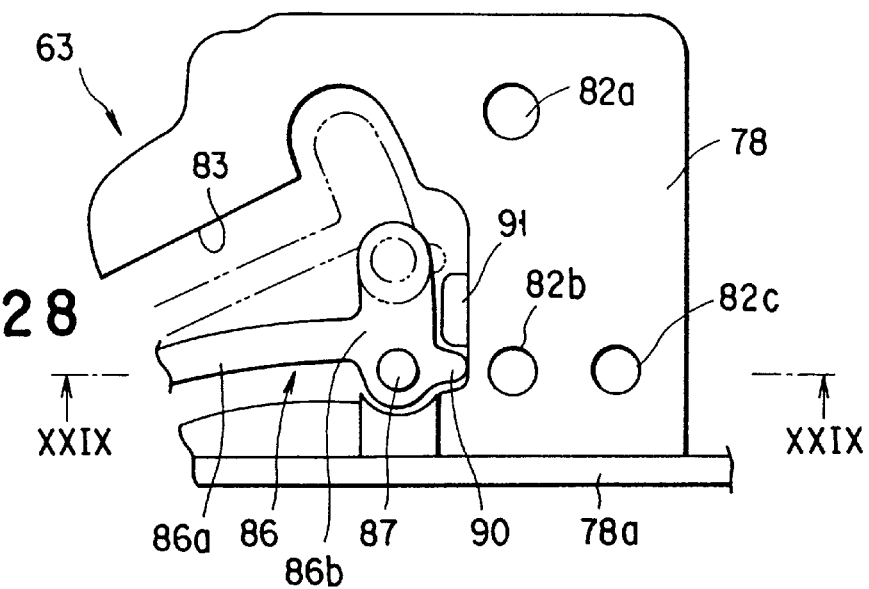
Figure 29:
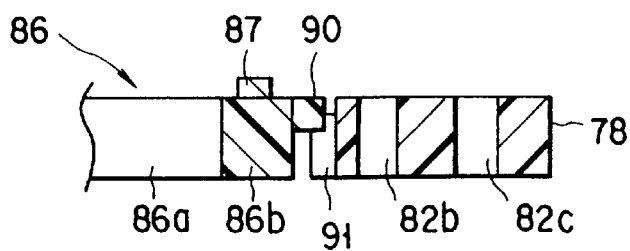

As shown in FIGS. 25, 28 and 29, the write protector 86 includes an elongate arm 86a extending from the body 78 into the aperture 83 and an operating piece 86b on an extended end of the arm. An operating protrusion 87 protrudes from the piece 86b.

The arm 86 can be elastically deformed to move the operating piece 86b by pressing the piece 86b through the operating protrusion 87. Thus, the write protector 86 is movable between a write protect position (indicated by full line in FIG. 28), in which a write detector of the disk drive unit is informed of inhibition of writing of data in the optical disk 14 in the cartridge 10, and a write position (indicated by tow-dot chain line in FIG. 28), in which the write detector is informed of permission to write data.

When the write protector 86 is in the write protect position, the first detection hole 66 in the casing 12 is closed by the operating piece 86b. When the protector 86 is shifted to the write position, in contrast with this, the first detection hole 66 is opened and communicates with the aperture 83 of the cover member 63. The drive-side detector detects the write inhibit or enable mode for data in accordance with the state, open or closed, of the hole 66.

The write protector 86 has an engaging protrusion 90 that projects from the operating piece 86b toward the body 78, while the body 78 includes a stopper 91 that projects into the aperture 83 and is in engagement with the protrusion 90. As the protrusion 90 abuts against the stopper 91, the protector 86 is held in the write protect position or the write position. By pressing the operating piece 86b to subject the write protector 86 to elastic deformation in the surface direction of the casing 12, the engaging protrusion 90 can be disengaged from the stopper 91 to allow the protector 86 to be switched.

Figure 30:
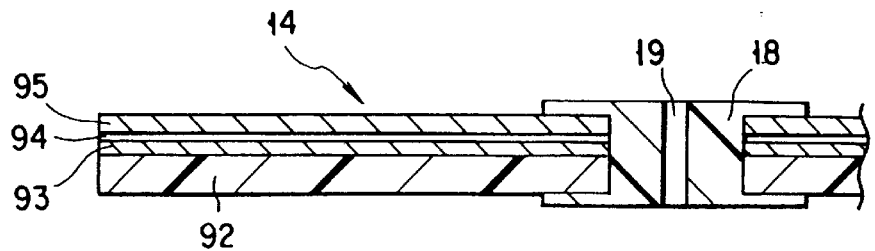
Figure 31:
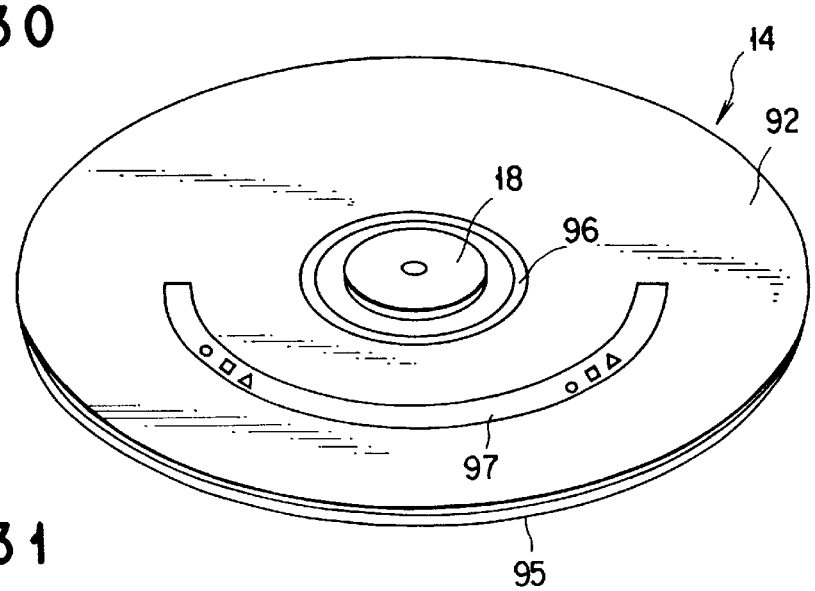

As shown in FIGS. 30 and 31, on the other hand, the optical disk 14 contained in the casing 12 comprises a base plate 92 formed of a plastic disk and a hub 18 having a center hole 19 and fixed to the center of the base plate. A reflective layer 93, a phase-change recording layer 94, and a transparent protective layer 95 are formed successively on one side of the base plate 92. The reflective layer 93 is obtained by vapor deposition or coating, for example. The recording layer 94 is obtained by being deposited to a given thickness on the reflective layer by vapor deposition or sputtering. The protective layer 95 is deposited to a given thickness on the surface of the recording layer by spin-coating or the like. The layer 95 prevents the recording layer 94 from being touched by the atmosphere and protects it.

Even in a read-only disk drive unit in which data are reproduced from a ROM-type disk that cannot be reloaded with data, the recorded data can be read by taking out the optical disk 14 from the casing 12 of the disk cartridge 10.

Once the RAM-type optical disk 14, which serves for high-density data recording, is taken out of the casing 12, however, it may be affected by some dust, or its protective layer 95 may suffer fine scratches or the like. As a result, there may be created some regions in which data cannot be recorded, and avoiding these regions in recording data may lower the writing speed, in some cases.

To cope with this, a visual information indicator region 96 is provided in a specific area of that surface of the base plate 92 of the optical disk 14 on the side opposite from the reflective layer 92. For example, predetermined descriptions associated with the category of the optical disk 14 or standards thereon, precautions, etc. are inscribed on the indicator region 96 by printing or the like so that they can be read by a user. The visual information indicator region 96 is in the form of a circle on the surface of the base plate 92, surrounding the hub 18 concentrically.

Further, an index area 97 is provided on that surface of the base plate 92 which carries the visual information indicator region 96 thereon. The area 97 can be loaded with individual information or an index for user's observation that identifies the cartridge from which the optical disk being currently handled is taken out. If disks are taken out individually from a plurality of cartridges, therefore, they can be restored accurately to their original cartridges.

In the index area 97, visual information can be written on the base plate 92 with a felt-tip pen (and oil ink) or pencil, for example. The area 97 is formed by suitably treating the surface of the base plate 92. More specifically, the index area 97 is obtained by forming an ink layer on the base plate surface or subjecting the base plate to surface treatment. In this case, the ink layer has a reflectance lower than that of the material of the base plate and a coefficient of friction that permits power (writing medium) obtained from the pencil to remain thereon. It is to be understood that the index area 97 may be colored as desired by printing or some other conventional method.

For other components including the shutter 22, the disk cartridge 10 according to the second embodiment is constructed in the same manner as the one according to the foregoing first embodiment. Therefore, like reference numerals are used to designate like portions throughout the drawings, and a detailed description of those portions is omitted.

Figure 33:
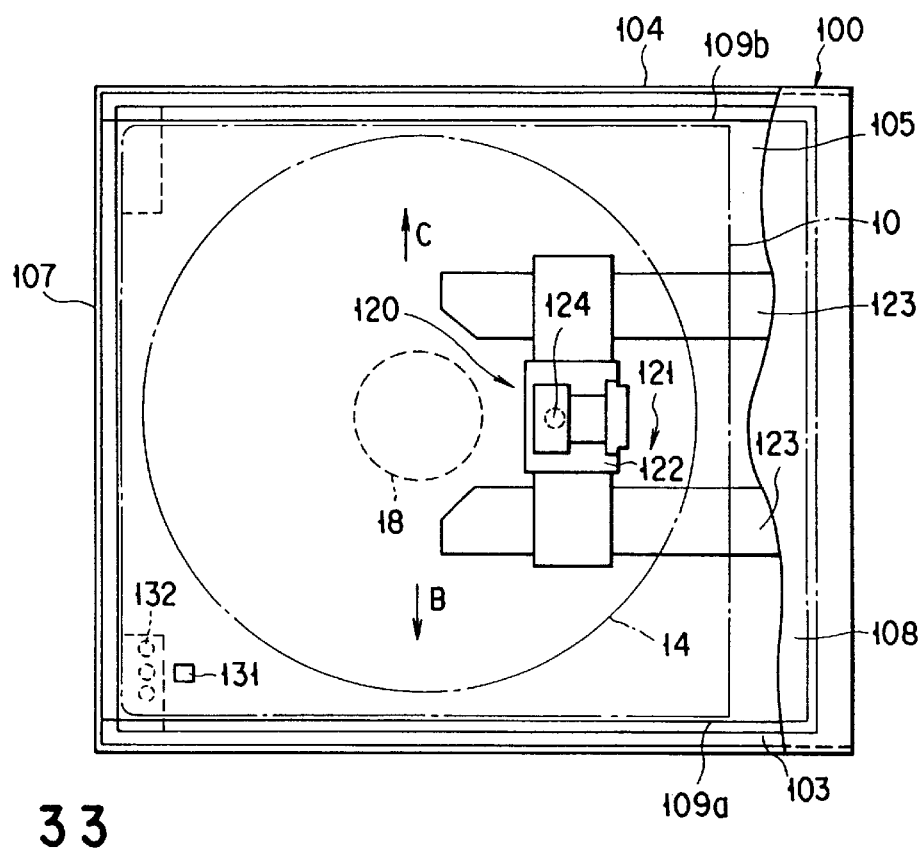
FIG. 33 is a plan view of the optical disk drive.
Figure 32:
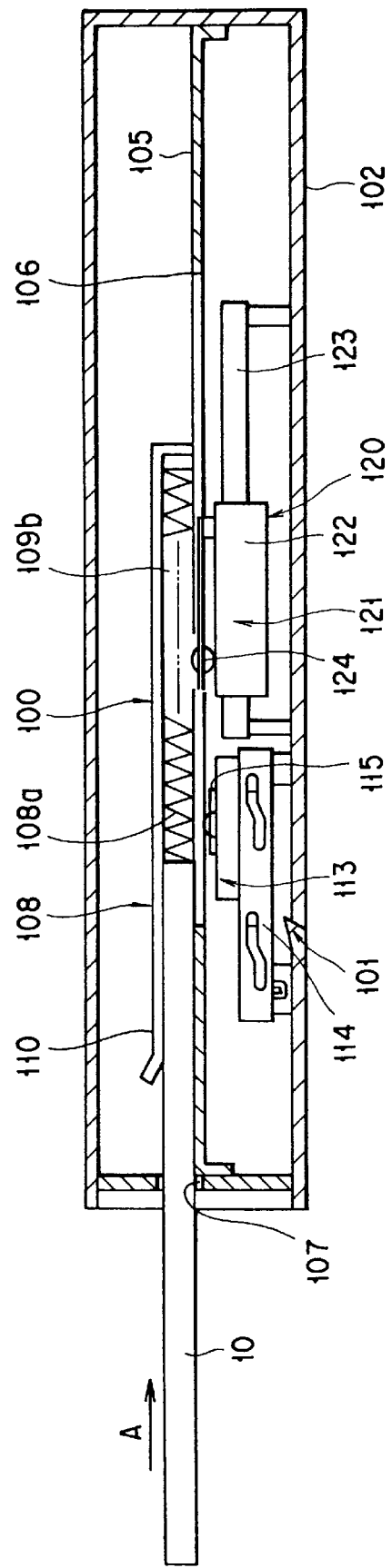
FIG. 32 is a sectional view of an optical disk drive.

FIGS. 32 and 33 show an example of an optical disk drive unit in which data are recorded in and retrieved from the optical disk 14 in the disk cartridge 10 constructed in the manner described above.

An optical disk drive unit (hereinafter referred to simply as drive unit) 100 has a unit body 101 in the form of a rectangular box. The unit body 101 includes a base 102 and first and second side walls 103 and 104 that extend at right angles to the base 102. Interposed between the side walls 103 and 104 is a partition wall 105 that extends substantially parallel to the base 102. Formed substantially in the center of the partition wall 105 is an aperture 106, which connects two internal spaces of the unit body 101 that are divided by the partition wall.

Further, the first side wall 103 is formed having a inlet/outlet port 107 through which the cartridge 10 is loaded into or unloaded from the unit body 101. The partition wall 105 is provided with a cartridge holder 108 for guiding to and holding the cartridge 10, inserted into the unit body 101 through the slot 107, in a recording/reproducing position in the body 101.

The cartridge holder 108 includes first and second guide walls 109a and 109b, which are paired and arranged on the partition wall 105, at a space a little greater than the width of the cartridge 10, and a cartridge retainer 110 that extends parallel to the partition wall 105 from the respective upper ends of the guide walls 109a and 109b toward the region between these guide walls.

Provided on the partition wall 105, moreover, is a shutter sliding mechanism (not shown) for sliding the shutter 22 of the disk cartridge 10 that is inserted in the cartridge holder 108. A spindle motor 113 and an optical head device 120 are arranged below the partition wall 105 and opposite the aperture 106. The motor 113 is used to rotate the optical disk 14 in the cartridge 10 that is guided to a predetermined position in the unit body 101. The head device 120 serves to record in or retrieve data from the optical disk 14.

The spindle motor 113 is supported by a lift mechanism 114 on the base 102 of the unit body 101 so as to be vertically movable between an operative position and a retreated position. In the operative position, the hub 18 of the optical disk 14 is supported by a turntable 115 that is mounted on the spindle nose of the motor 113. In the retreated position, the motor 113 is retreated lest the turntable 115 and the cartridge 10 come into contact with each other when the cartridge 10 is loaded or unloaded.

The optical head device 120 includes a linear motor 121 extending in the radial direction of the optical disk 14 and a carriage 122, which shares a part with the motor 121 and is movable in the radial direction of the disk 14. The carriage 122 is moved in the radial direction of the optical disk 14 along guide rails 123 for the linear motor 121.

The carriage 122 carries thereon a semiconductor laser device (not shown), objective lens 124, actuator (not shown), photodetector (not shown), etc. The laser device emits laser beams with a given wavelength to be applied to the optical disk 14. The lens 124 focuses the laser beams from the laser device on a recording surface of the optical disk and converges the laser beams reflected by the recording surface of the disk. The actuator holds the objective lens 124 for movement in a direction perpendicular to the recording surface of the optical disk 14 and across a track on the recording surface. The photodetector photoelectrically converts the reflected laser beams converged by the lens 124 and fetch them as data recorded on the optical disk.

As shown in FIG. 33, the drive unit 100 comprises a disk take-out detector 131. The detector 131 detects the presence of the detection pin 74 (see FIG. 26) of the indicator mechanism attached to the cartridge 10 that is locked in the recording/reproducing position in the drive unit 100 by means of a locking mechanism (not shown), through the first through hole 82a of the cover member 63 and the disk take-out indicator hole 65 of the casing 12.

The drive unit 100 further comprises a detector 132, which detects inhibition or permission of writing of data in the optical disk 14 in accordance with the state, open or closed, of the first detection hole 66 of the cartridge 10 in a predetermined position in the drive unit 100, and detects the effective or noneffective surface of the optical disk, depending on the presence of the second detection hole 67.

The following is a description of a loading operation of the drive unit 100 for the disk cartridge 10. When the cartridge 10 is inserted into the inlet/outlet port 107, as indicated by arrow A in FIG. 32, it is guided onto the partition wall 105. As this is done, the opposite side faces of the cartridge 10 are restrained from inclining sideways by the first and second guide walls 109a and 109b of the cartridge holder 108, and moreover, the cartridge 10 is restrained from oscillating vertically by the cartridge retainer 110, and is inserted into a space between the partition wall 105 and the retainer 110. If the disk cartridge 10 is inserted inside out into the holder 108, the noneffective surface of the optical disk is detected by the detector 132, and the user is informed of the reversed loading of the cartridge.

When the cartridge 10 is inserted into a predetermined position in the cartridge holder 108, the shutter sliding mechanism (not shown) starts to slide the shutter 22 open. When the cartridge 10 is further inserted resisting the repulsive force of a compression spring 108a in the holder 108, the shutter 22 is slid fully open, whereupon the cartridge is stopped at a predetermined position, and is locked in the recording/reproducing position by the locking mechanism (not shown).

Subsequently, the spindle motor 113 is moved from the retreated position to the operative position by the lift mechanism 114. Thereupon, the turntable 115 of the motor 113 engages the hub 18 of the optical disk 14 in the cartridge 10, thereby supporting the disk 14 for rotation.

Then, the linear motor 121 of the optical head device 120 is energize to move the carriage 122 along the guide rails 123 to a predetermined position. Subsequently, a laser beam emitted from the semiconductor laser device on the carriage 122 is applied through a window in the cartridge 10 to the recording surface of the optical disk 14 by the objective lens 124. The position of the lens 124 is controlled (for focusing) so that the distance between the recording surface of the optical disk and the lens 124 is equal to the focal distance of the lens 124 that focuses the laser beam. Also, the carriage 122 is finely moved (for tracking) in the radial direction of the optical disk 14 so that the center of a guide groove or track formed on the recording surface of the disk 14 is in line with the main component of the laser beam transmitted through the objective lens 124.

With the objective lens 124 focused on the recording surface of the optical disk 14 and tracked in this manner, data are retrieved from the disk 14, and if necessary, data are recorded in the disk 14.

In ejecting the cartridge 10 from the drive unit 100, an ejection switch (not shown) is depressed, whereupon the spindle motor 113 is lowered from the operative position to the retreated position by the lift mechanism 114, so that the turntable 115 is separated from the hub 18 of the optical disk 14. Then, the cartridge 10 is released from the locking effect of the locking mechanism.

Thereafter, the cartridge 10 is forced out toward the inlet/outlet port 107 by the compression spring 108*a* in the cartridge holder 108. As the cartridge 10 is thus moved toward the slot 107, the shutter 22 is moved by the shutter sliding mechanism to the closed position, thereby closing the window.

Constructed in this manner, the disk cartridge according to the second embodiment can produce the same effects as the disk cartridge according to the first embodiment. According to the second embodiment, moreover, the disk cartridge has the disk inlet/outlet port in the casing and the cover member for opening and closing the slot, and the optical disk can be taken out of the casing. Accordingly, data can be written in the optical disk without taking it out of the cartridge, and can be reproduced by means of the read-only disk drive unit after removing the disk from the cartridge. Thus, data written in the optical disk by one user can be shared among a plurality of users.

Since the cartridge is provided with the indicator mechanism that can indicate whether or not the optical disk has been taken out at least once from the cartridge, the user can be cautioned against a reduction in operating speed and the like that may possibly be caused when data are written in a reloaded optical disk.

Although a removable optical disk has its recording surface on one side only, it has a visual information recording region in which the user can optionally record visual information, on the other side, and the user can display his desired identification information on the recording region. Thus, the cartridge from which optical disk is taken out can be identified with ease.

Further, the cover member of the cartridge includes the gripper slots for the autochanger mechanism of the drive unit that is formed integrally with the cartridge, the disk take-out indicator for indicating whether or not the disk has been taken out at least once from the cartridge, and the write protector for inhibiting data from being written in the disk. When the cover member is swung open with respect to the cartridge body, the optical disk can be easily removed from the cartridge in the case where the cartridge is a RAM cartridge whose width is a little greater than the outside diameter of the disk.

The write protector can accurately indicate a write inhibit position in which data are inhibited from being written in the disk and a write enable position in which data writing is permitted, by means of the stopper that is formed integrally with the cover member. Thus, previously stored data can be prevented from being erased by mistake.

The optical disk 14 according to the second embodiment is a reloadable disk that has its recording surface on one side only. The recording surface of the optical disk is restricted to one side for the following reason. Drive units owned by many of users who usually reproduce only commercially available software, electronic books, etc. are very likely to be read-only drive units in which a disk is inserted singly or in a plain form. In retrieving data from a RAM-type disk, an optical disk is contained in a RAM cartridge is taken out of the cartridge when it is used.

To those users who frequently use RAM-type disks to store data, on the other hand, restriction of the recording surface of the optical disk to one side implies only a reduction in recording density and an increase in number of RAM cartridges to be held. Accordingly, there is a need of RAM cartridges that are designed for double-sided RAM disks.

According to the present invention, therefore, information recording media are not limited to optical disks that have recording/reproducing surfaces on either side, and may be ones that have a recording/reproducing surface on one side only.

It is to be understood that the present invention is not limited to the embodiments described above, and that various changes and modifications may be effected therein by one skilled in the art without departing from the scope or spirit of the invention. According to the embodiments described herein, for example, the shutter 22 is provided with two pairs of guide protrusions 52*a* and 52*b*. However, a shutter having only one pair of guide protrusions can produce the same effects as the ones according to the foregoing embodiments. In this case, the guide protrusions 52*a* and 52*b* are arranged in the central portion of the connecting plate 22*b* of the shutter 22, and their width in the moving direction of the shutter is greater enough.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

I claim:

1. A disk cartridge comprising:

a flat rectangular casing containing a disk-shaped recording medium, the casing having two parallel principal surfaces each formed having a respective window section through which a part of the recording medium is exposed, a front end face, two parallel side faces, and a bridge section, constituting a part of the front end face and facing front ends of the window sections, the bridge section having a thickness smaller than that of portions of the casing other than the bridge section;

a shutter attached to the casing for movement between a closed position in which the shutter closes the window sections and covers the bridge section and two open positions on either side of the window sections in which the shutter allows the window sections to open and exposes the bridge section; and a pair of shutter springs arranged on either side of the shutter in the casing and urging the shutter toward the closed position, thereby holding the shutter in the closed position, the casing including spring storing sections defined on either side of the window sections and individually containing the shutter springs, and two aperture portions opening in the front end face on either side of the bridge section, the aperture portions communicating individually with the spring storing sections and allowing insertion of the shutter springs into the spring storing sections while the shutter is at the closed position, each of the shutter springs having a fixed end fixed to the casing and a movable end adapted releasably to engage the casing and the shutter when the shutter is in the closed position, and the shutter being adapted to press the movable end of the shutter spring on the side of one of the open positions toward the fixed end, thereby disengaging the movable end from the casing, and to separate from the movable end of the shutter spring on the side of the other open position when the shutter moves from the closed position toward the one open position.

2. A disk cartridge comprising:

a flat rectangular casing containing a disk-shaped recording medium, the casing having two parallel principal surfaces each formed having a respective window section through which a part of the recording medium is exposed, a front end face, two parallel side faces, and a bridge section, constituting a part of the front end face and facing front ends of the window sections, the bridge section having a thickness smaller than that of portions of the casing other than the bridge section;

a shutter attached to the casing for movement between a closed position in which the shutter closes the window sections and covers the bridge section and two open positions on either side of the window sections in which the shutter allows the window sections to open and exposes the bridge section; and a pair of shutter springs arranged on either side of the shutter in the casing and urging the shutter toward the closed position, thereby holding the shutter in the closed position, the casing including spring storing sections defined on either side of the window sections and individually containing the shutter springs, and two aperture portions opening in the front end face on either side of the bridge section, the aperture portions communicating individually with the spring storing sections and allowing insertion of the shutter springs into the spring storing sections while the shutter is at the closed position, and each of the shutter springs having a fixed end fixed to the casing and a movable end adapted releasably to engage the casing and the shutter when the shutter is in the closed position, the movable end of the shutter spring on the side of one of the open positions being adapted to be pressed toward the fixed end to be disengaged from the casing by the shutter, with the movable end of the shutter spring on the side of the other open position disengaged from the shutter and kept in engagement with the casing, when the shutter moves from the closed position toward the one open position.

3. A disk cartridge comprising:

a flat rectangular casing containing a disk-shaped recording medium, the casing having two parallel principal surfaces each formed having a respective window section through which a part of the recording medium is exposed, a front end face, two parallel side faces, and a bridge section, constituting a part of the front end face and facing front ends of the window sections, the bridge section having a thickness smaller than that of portions of the casing other than the bridge section;

a shutter attached to the casing for movement between a closed position in which the shutter closes the window sections and covers the bridge section and two open positions on either side of the window sections in which the shutter allows the window sections to open and exposes the bridge section; and a pair of shutter springs arranged on either side of the shutter in the casing and urging the shutter toward the closed position, thereby holding the shutter in the closed position, the casing including spring storing sections formed on either side of the window sections and individually containing the shutter springs, two aperture portions opening in the front end face on either side of the bridge section, the aperture portions communicating individually with the spring storing sections and allowing insertion of the shutter springs into the spring storing sections while the shutter is at the closed position, retaining spring bearings situated adjacent to the window sections in the spring storing sections, individually, and fixed spring bearings situated at distances from the window sections in the spring storing sections, individually, the shutter including a pair of movable spring bearings adapted to be situated individually in line with the retaining spring bearings when the shutter is in the closed position, and each of the shutter springs being formed of a torsion spring and having a fixed end in engagement with each corresponding fixed spring bearing, and a movable end adapted to engage each corresponding retaining spring bearing and the movable spring bearing in alignment therewith when the shutter is in the closed position, to move in engagement with the movable spring bearing toward the fixed end and separate from the retaining spring bearing when the shutter moves from the closed position toward the one open position, and to separate from the movable spring bearing and be held by the retaining spring bearing when the shutter moves from the closed position toward the other open position.

4. A disk cartridge according to claim 3, wherein the retaining spring bearings are formed on the bridge section so as to face the spring storing sections, individually, and the bridge section includes a moving groove extending in the vicinity of the retaining spring bearings and allowing the movable spring bearings of the shutter to move therein.

5. A disk cartridge according to claim 3, wherein the fixed spring bearings adjoins the side faces of the casing in the corresponding spring storing sections, individually.

6. A disk cartridge according to claim 3, wherein the shutter includes a pair of shielding plates slidable on the two principal surfaces, individually, and a connecting plate connecting the shielding plates to each other and facing the front end face of the casing, and the movable spring bearings of the shutter protrude from the connecting plate toward the front end face of the casing.

7. A disk cartridge according to claim 3, which further comprises guide means for guiding the shutter in movement, the guide means including a guide groove extending along the front end face of the casing, and a guide protrusion provided on the shutter and movable on the bridge section and in each spring storing section as the shutter moves, the guide groove having a first portion formed on the bridge section and a pair of second portions formed on the inner surface of the casing in each spring storing section and aligned straight with the first portion, and the guide protrusion having a first projection adapted to engage the first portion of the guide groove as the guide protrusion moves on the bridge section, and a second projection adapted to engage the second portion of the guide groove as the guide protrusion moves in the spring storing section.

8. A disk cartridge according to claim 7, wherein the shutter includes a pair of shielding plates slidable on the two principal surfaces of the casing, individually, and a connecting plate connecting the shielding plates to each other and facing the front end face of the casing, the guide protrusion projects substantially parallel to the shielding plates from the connecting plate, and the first and second projections project in opposite directions from an extended end portion of the guide protrusion.

9. A disk cartridge according to claim 3, wherein the shutter has a width greater than that of the window section such that opposite side edge portions of the shutter overlap the outer surface of the casing when the shutter is in the closed position, and the pair of retaining spring bearings and the pair of movable spring bearings are arranged so as to be situated in regions such that shutter and the casing overlap each other when the shutter is in the closed position.

10. A disk cartridge according to claim 3, wherein the movable spring bearings and the fixed spring bearings are situated with an offset in a direction perpendicular to the moving direction of the shutter.

11. A disk cartridge according to claim 3, wherein the casing includes guide surfaces located individually in the spring storing sections and adapted individually to guide the respective movable ends of the shutter springs to predetermined positions with respect to the retaining spring bearings corresponding thereto when the shutter moves from the open position to the closed position.

12. A disk cartridge according to claim 3, wherein the fixed spring bearings, retaining spring bearings, and movable spring bearings individually have guide surfaces facing the aperture portions and declining toward the spring storing sections so as to guide the respective fixed and movable ends of the shutter springs to the fixed spring bearings, retaining spring bearings, and movable spring bearings, individually, when the shutter springs are loaded into the spring storing sections through the aperture portions, individually.

13. A disk cartridge comprising:

a flat rectangular casing containing a disk-shaped recording medium, the casing having two parallel principal surfaces each formed having a respective window section through which a part of the recording medium is exposed, a front end face, two parallel side faces, and a bridge section, constituting a part of the front end face and facing front ends of the window sections, the bridge section having a thickness smaller than that of portions of the casing other than the bridge section;

a shutter attached to the casing for movement between a closed position in which the shutter closes the window sections and covers the bridge section and two open positions on either side of the window sections in which the shutter allows the window sections to open and exposes the bridge section;

guide means for guiding the shutter in movement; and a pair of shutter springs arranged on either side of the shutter in the casing and urging the shutter toward the closed position, thereby holding the shutter in the closed position, the casing including spring storing sections formed on either side of the window sections and individually containing the shutter springs, two aperture portions opening in the front end face of the casing on either side of the bridge section, communicating individually with the spring storing sections, and allowing the shutter springs to be inserted therein, the guide means including a guide groove extending along the front end face of the casing, and a guide protrusion provided on the shutter and movable on the bridge section and in each spring storing section as the shutter moves, and the guide groove having a first portion formed on the bridge section, and a pair of second portions formed on the inner surface of the casing in each spring storing section and aligned straight with the first portion, the guide protrusion having a first projection adapted to engage the first portion of the guide groove as the guide protrusion moves on the bridge section, and a second projection adapted to engage the second portion of the guide groove as the guide protrusion moves in the spring storing section.

14. A disk cartridge according to claim 13, wherein the shutter includes a pair of shielding plates slidable on the two principal surfaces, individually, and a connecting plate connecting the shielding plates to each other and facing the front end face of the casing, and the guide protrusion projects substantially parallel to the shielding plates from the connecting plate, and the first and second projections project in opposite directions from an extended end portion of the guide protrusion.

15. A disk cartridge comprising:

a flat rectangular casing containing an optical disk capable of information processing on either side, the casing having two parallel principal surfaces each formed having a respective window section through which a part of the optical disk is exposed, a front end face, two parallel side faces, and a bridge section, constituting a part of the front end face and facing front ends of the window sections, the bridge section having a thickness smaller than that of portions of the casing other than the bridge section;

a shutter attached to the casing for movement between a closed position in which the shutter closes the window sections and covers the bridge section and two open positions on either side of the window sections in which the shutter allows the window sections to open and exposes the bridge section; and a pair of shutter springs arranged on either side of the shutter in the casing and urging the shutter toward the closed position, thereby holding the shutter in the closed position, the casing including spring storing sections formed on either side of the window sections and individually containing the shutter springs, two aperture portions opening in the front end face of the casing on either side of the bridge section, communicating individually with the spring storing sections, and allowing the shutter springs to be inserted therein, retaining spring bearings situated adjacent to the window sections in the spring storing sections, individually, and fixed spring bearings situated at distances from the window sections in the spring storing sections, individually, the shutter including a pair of movable spring bearings adapted to be situated individually in line with the retaining spring bearings when the shutter is in the closed position, and each of the shutter springs being formed of a torsion spring and having a fixed end in engagement with each corresponding fixed spring bearing, and a movable end adapted to engage each corresponding retaining spring bearing and the movable spring bearing in alignment therewith when the shutter is in the closed position, to move in engagement with the movable spring bearing toward the fixed end and separate from the retaining spring bearing when the shutter moves from the closed position toward the one open position, and to separate from the movable spring bearing and be held by the retaining spring bearing when the shutter moves from the closed position toward the other open position.

16. A disk cartridge comprising:

a flat rectangular casing containing a disk-shaped recording medium, the casing having two parallel principal surfaces each formed having a respective window section through which a part of the recording medium is exposed, a front end face, two parallel side faces, and a bridge section, constituting a part of the front end face and facing front ends of the window sections, the bridge section having a thickness smaller than that of portion of the casing other than the bridge section, and a disk inlet/outlet port through which the recording medium can be loaded into and unloaded from the casing;

a cover member attached to the casing for movement between a closed position in which the cover member closes the disk inlet/outlet port and an open position in which the cover member allows the disk inlet/outlet port to open;

a shutter attached to the casing for movement between a closed position in which the shutter closes the window sections and two open positions on either side of the window sections in which the shutter allows the window sections to open and exposes the bridge section; and a pair of shutter springs arranged on either side of the shutter in the casing and urging the shutter toward the closed position, thereby holding the shutter in the closed position, the casing including spring storing sections formed on either side of the window sections and individually containing the shutter springs, two aperture portions opening in the front end face of the casing on either side of the bridge section, communicating individually with the spring storing sections, and allowing the shutter springs to be inserted therein, each of the shutter springs having a fixed end fixed to the casing and a movable end adapted releasably to engage the casing and the shutter when the shutter is in the closed position, and the shutter being adapted to press the movable end of the shutter spring on the side of one of the open positions toward the fixed end, thereby disengaging the movable end from the casing, and to separate from the movable end of the shutter spring on the side of the other open position when the shutter moves from the closed position toward the one open position.

17. A disk cartridge according to claim 16, which further comprises disk take-out detecting means for revealing that the recording medium has been taken out at least once from the casing through the disk inlet/outlet port.

18. A disk cartridge according to claim 17, wherein the disk take-out detecting means includes a take-out indicator hole formed in the casing and a detection member provided in the casing so as to be fitted in the indicator hole and adapted to be removed from the indicator hole when the cover member is moved to the open position thereof.

19. A disk cartridge according to claim 18, wherein the detection member includes a detection pin provided in the casing so as to be able to be cut off, and the cover member has a through hole through which the detection pin is passed.

20. A disk cartridge according to claim 16, wherein the casing has a first detection hole for indicating inhibition or permission of writing of information in the recording medium, a second detection hole for indicating the direction of the recording medium, a third detection hole in reserve, and a take-out indicator hole for indicating that the recording medium has been taken out at least once from the casing, the first to third detection holes being arranged side by side on a first straight line substantially parallel to one side edge of the casing, the take-out indicator hole being located on a second straight line extending perpendicular to the first straight line and passing through the second detection hole.

21. A disk cartridge according to claim 20, wherein the cover member has a plurality of through holes which are situated individually in alignment with the first to third detection holes and the take-out indicator hole when the cover member is in the closed position thereof.

22. A disk cartridge according to claim 16, wherein the casing has a gripper slot formed in the vicinity of the disk inlet/outlet port and opening in the outer surface of the casing, and the cover member has a recess which is situated in alignment with the gripper slot when the cover member is in the closed position thereof.

* * * * *